Figure 1:
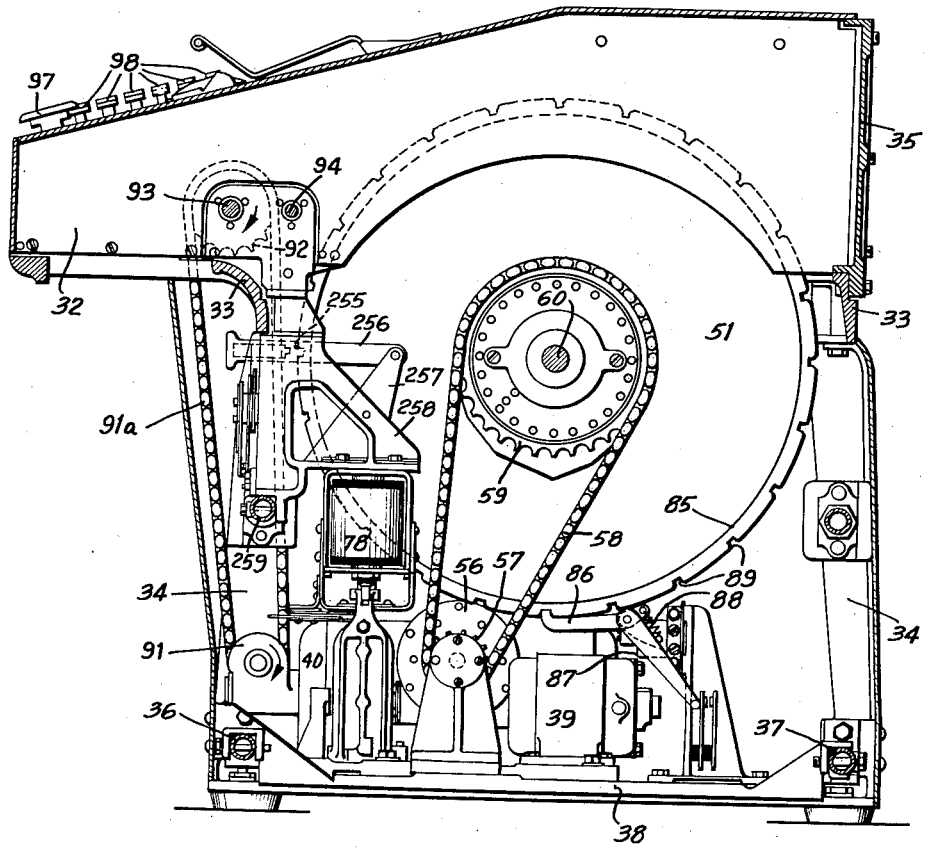

Oct. 4, 1938.　　　　　　S. BRAND　　　　　　2,131,912
CHECK SORTING MACHINE WITH CARD PUNCHING ATTACHMENT
Filed Feb. 25, 1937　　　　16 Sheets-Sheet 1

INVENTOR
Samuel Brand
BY
ATTORNEY

Oct. 4, 1938.  S. BRAND  2,131,912
CHECK SORTING MACHINE WITH CARD PUNCHING ATTACHMENT
Filed Feb. 25, 1937  16 Sheets-Sheet 2
FIG. 1a.
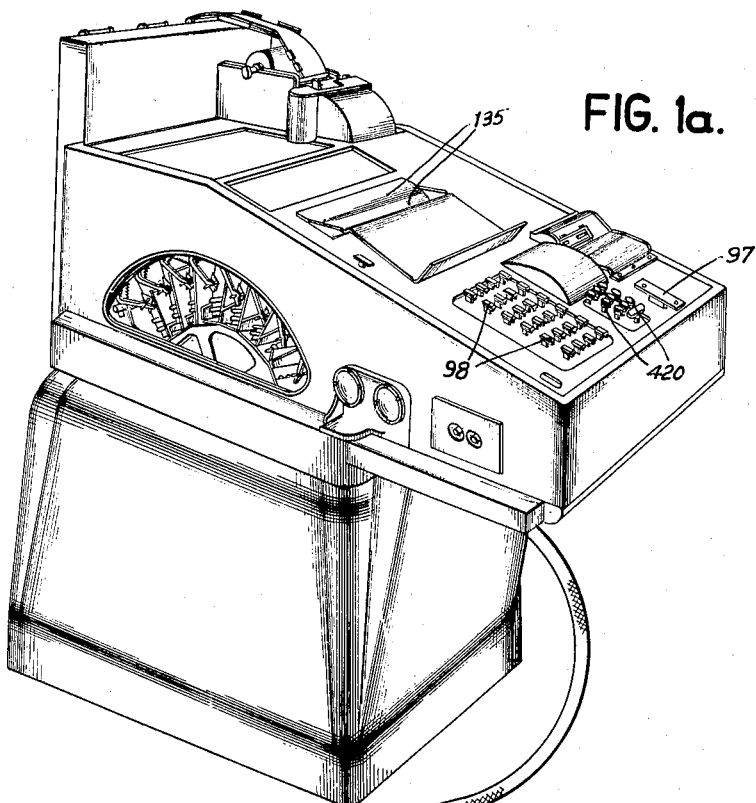
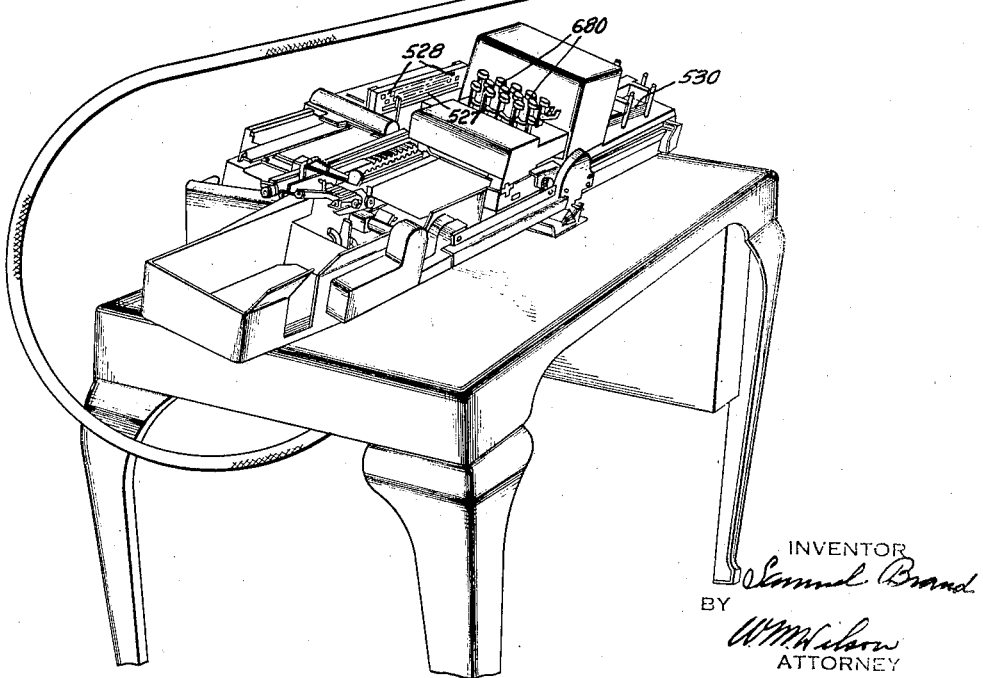
INVENTOR
Samuel Brand
BY
W. M. Wilson
ATTORNEY Oct. 4, 1938.    S. BRAND    2,131,912
CHECK SORTING MACHINE WITH CARD PUNCHING ATTACHMENT
Filed Feb. 25, 1937    16 Sheets-Sheet 3

INVENTOR
Samuel Brand
BY
W. M. Wilson
ATTORNEY

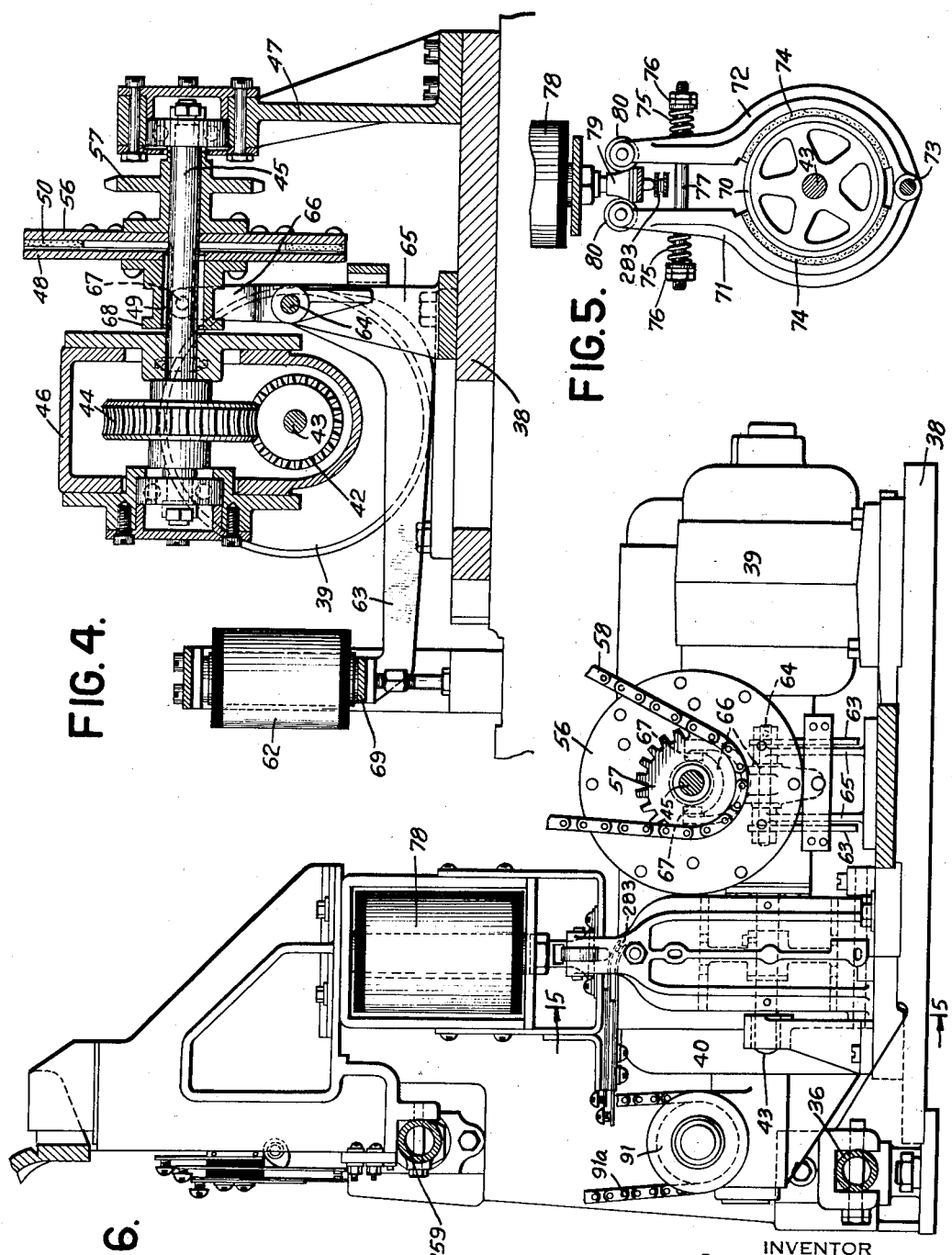

Oct. 4, 1938. S. BRAND 2,131,912
CHECK SORTING MACHINE WITH CARD PUNCHING ATTACHMENT
Filed Feb. 25, 1937 16 Sheets-Sheet 5

INVENTOR
Samuel Brand
BY
W. M. Wilson
ATTORNEY

Oct. 4, 1938.  S. BRAND  2,131,912
CHECK SORTING MACHINE WITH CARD PUNCHING ATTACHMENT
Filed Feb. 25, 1937    16 Sheets-Sheet 6
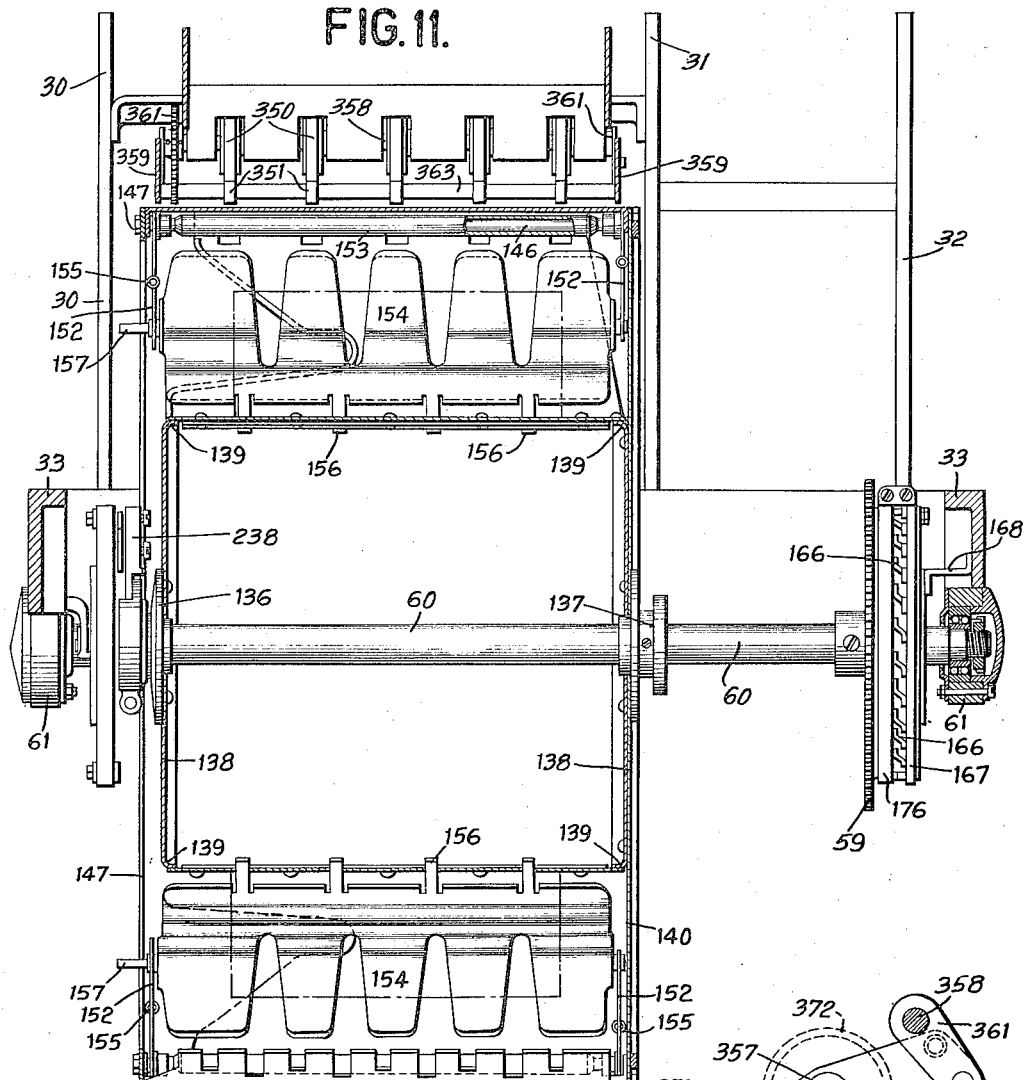
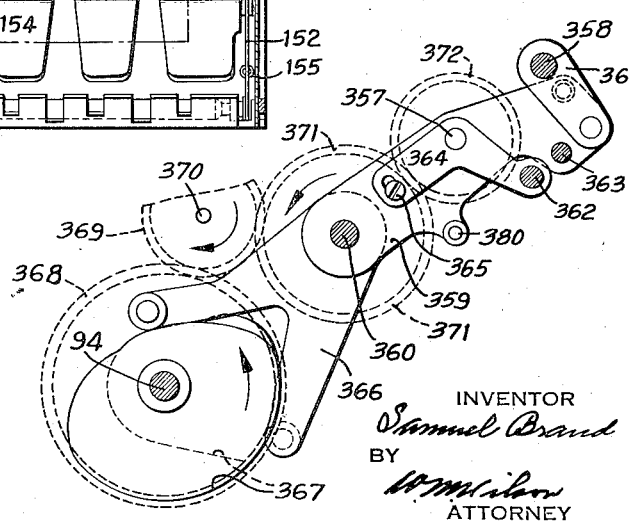
INVENTOR
Samuel Brand
BY
ATTORNEY Oct. 4, 1938. S. BRAND 2,131,912
CHECK SORTING MACHINE WITH CARD PUNCHING ATTACHMENT
Filed Feb. 25, 1937 16 Sheets-Sheet 10

Oct. 4, 1938.  S. BRAND  2,131,912
CHECK SORTING MACHINE WITH CARD PUNCHING ATTACHMENT
Filed Feb. 25, 1937  16 Sheets-Sheet 13

INVENTOR
Samuel Brand
BY
W. M. Nichols
ATTORNEY

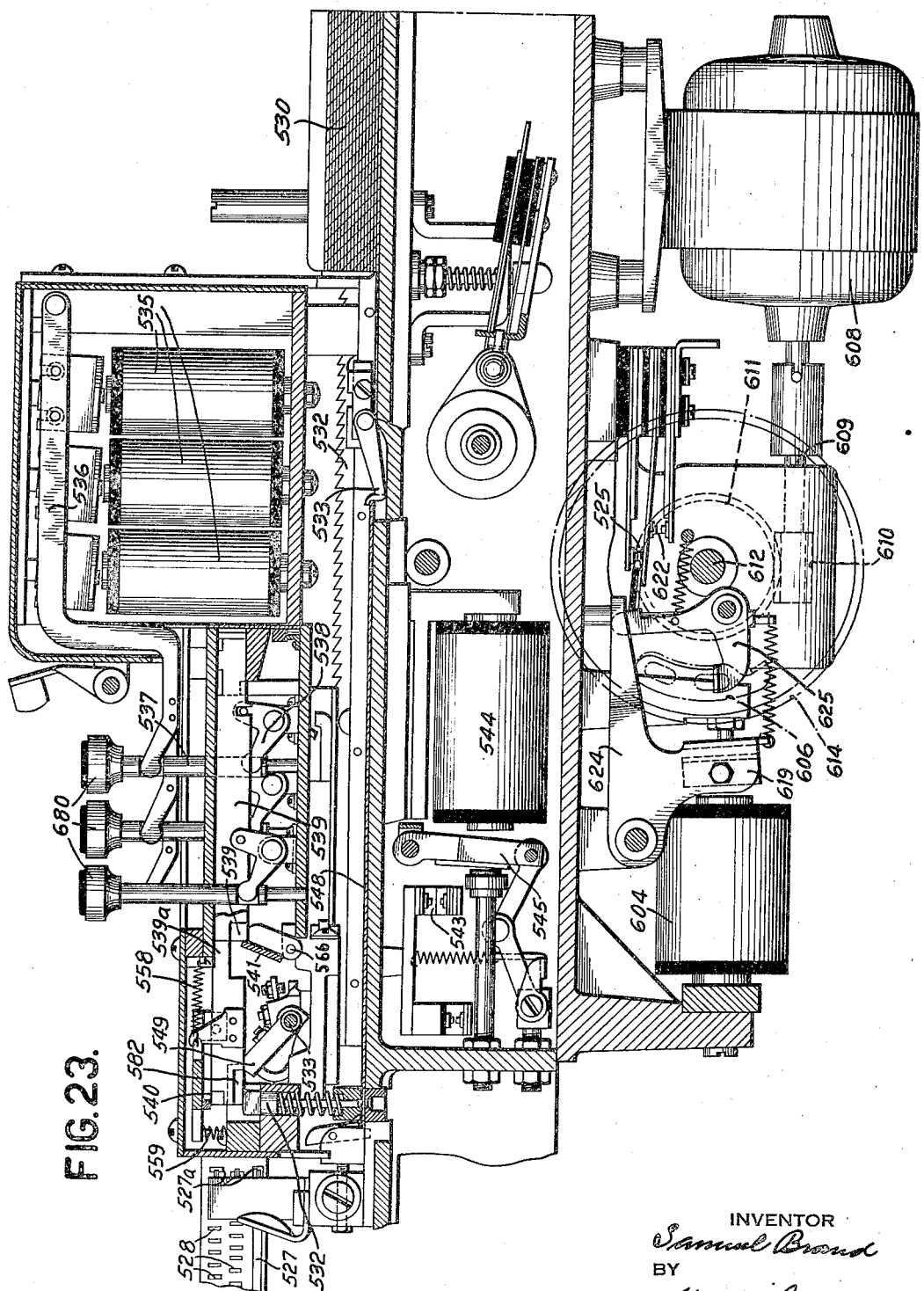

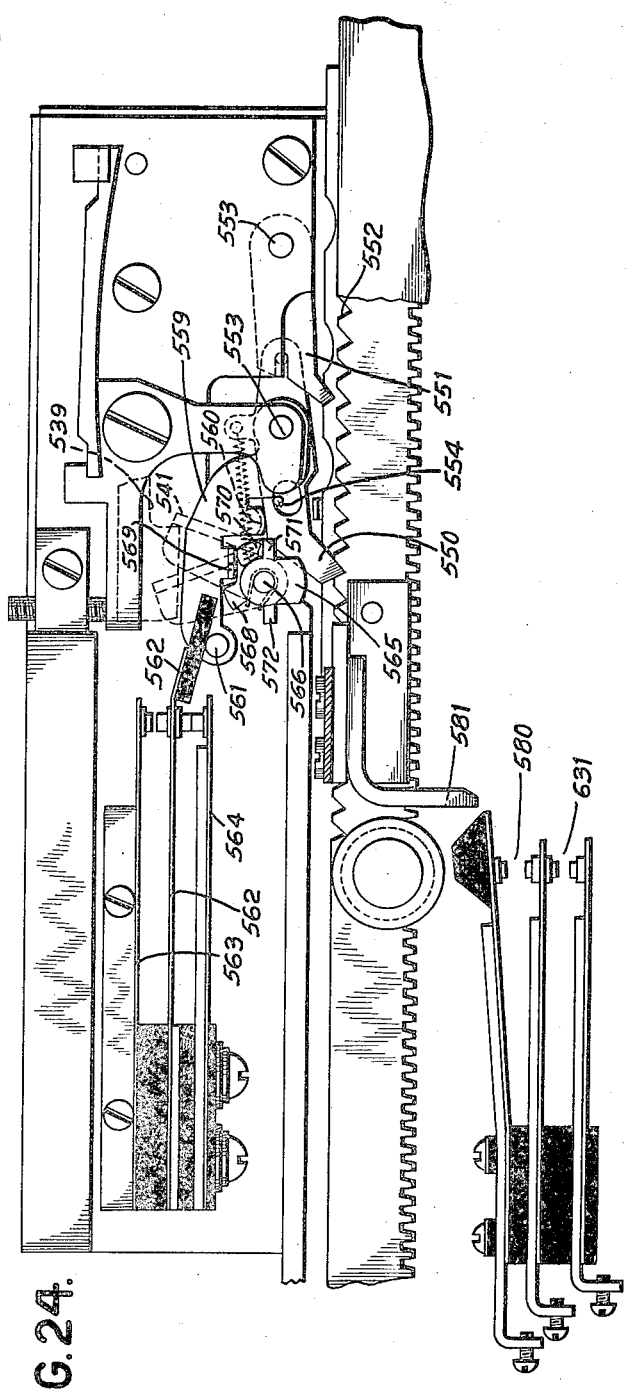

INVENTOR.
Samuel Brand
BY
ATTORNEYS.

Patented Oct. 4, 1938

2,131,912

UNITED STATES PATENT OFFICE 2,131,912

CHECK SORTING MACHINE WITH CARD PUNCHING ATTACHMENT

Samuel Brand, Binghamton, N. Y., assignor to International Business Machines Corporation, New York, N. Y., a corporation of New York Application February 25, 1937, Serial No. 127,640

21 Claims. (Cl. 164—113)

The improvements herein described forming the subject matter of the present invention relate to machines of the type shown in the patent to F. L. Fuller, No. 1,966,623 issued July 17, 1934 and in the application for Letters Patent of the United States, Serial No. 743,044, filed Sept. 7, 1934 in the name of F. L. Fuller and S. Brand. It is thought that a brief description of the machine to which the present invention is applied will be helpful for an understanding of the functions of the machine and the application of the present invention.

Such machines are designed to simultaneously list and sort groups of promiscuously arranged checks so that checks drawn on the same bank can be sorted and a list of the amounts of checks of each group can be printed on a separate tape. The amounts of the checks are listed under control of a ten-key keyboard and the checks are then dropped into an aperture which communicates with a selected compartment of a sorting drum which carries compartments annularly arranged about the drum. The drum is rotated under control of the keys of a second keyboard to bring the selected compartment into registration with the aperture. The sorting drum is controlled to rotate from its last position to the selected position in the direction of the shorter path.

These machines are also provided with a plurality of totalizers, there being a totalizer for each sorting compartment. The amount of each check sorted in a particular compartment is entered into the totalizer identified with the compartment. The machines are also provided with separate printers one for each compartment so that the amounts of checks of the same classification can be printed together on a separate tape.

Due to structural and operating limitations the present form of machine can take care of twenty-four classifications. Obviously, commercial transactions require more classifications, and the extra classifications are usually miscellaneous in type and can be taken care of as a separate group. The printer associated with the sorting compartment will give only the list of the amounts of all the checks in the miscellaneous group and for this miscellaneous group it is desirable to have separate lists of the amounts of all checks of the same classification in the miscellaneous group.

It is therefore an object of the present invention to devise an attachment for the check sorting machine which will cause the punching on a tabulating card of the amount of the checks sorted in the miscellaneous compartment.

It is a further object to control the punching of the cards by a separate punching machine by the key which selects the miscellaneous compartment and to cause the amounts to be punched to be determined by the keys which are depressed to represent the amounts.

It is a further object to cause the stacking of the punched cards in the same order that the miscellaneous checks are sorted in the miscellaneous compartment. With this arrangement it is possible to re-insert the punched cards in the punching machine and by the usual keys cause the punching on the cards of the classifications of the miscellaneous checks. By existing machines on the market these checks can be sorted according to their classifications and by existing tabulating machines separate lists of the amounts of checks of the same classification can be prepared. By this system the utility of the check sorting machine is greatly increased and almost any number of check classifications can be taken care of.

It is a further object of the present invention to provide set up devices in the check sorting machine for controlling the punching of the amounts and to set them invariably for the amount of each check sorted.

A still further object of the present invention is to provide a control rendered effective by the key associated with the miscellaneous pocket for causing the set-up devices to control the punching of the amounts and for rendering the punching machine automatically effective.

A still further object of the invention is to cause the punching machine to be operated automatically and independently of the check sorting machine and to effect the digit punching operations successively.

A still further object of the present invention is to provide a locking arrangement whereby the operation of the punching machine causes the automatic locking of the motor release bar which causes check feeding operations until the punching is completed. However, the arrangement provides the possibility of depressing the compartment selecting key for the next check and the subsequent operation of the keys which are depressed for representing the amount of the next check. In this manner the operator may be busy with operations incidental to the next check and by the time these are completed, punching will be terminated and the motor release bar unlocked so that check feeding operations under control thereof may be instituted. By this overlapping of operations the operator is not held up in his work any more time than is necessary, so that the work may proceed with efficiency and rapidity.

Further and other objects and advantages will be hereinafter set forth in the accompanying specification and claims, and shown in the drawings, which by way of illustration show what is now considered to be the preferred embodiment of the invention.

Figure 2:
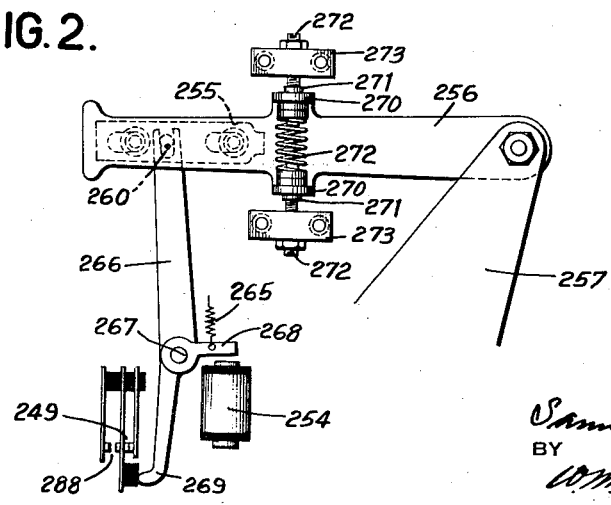
Figure 3:
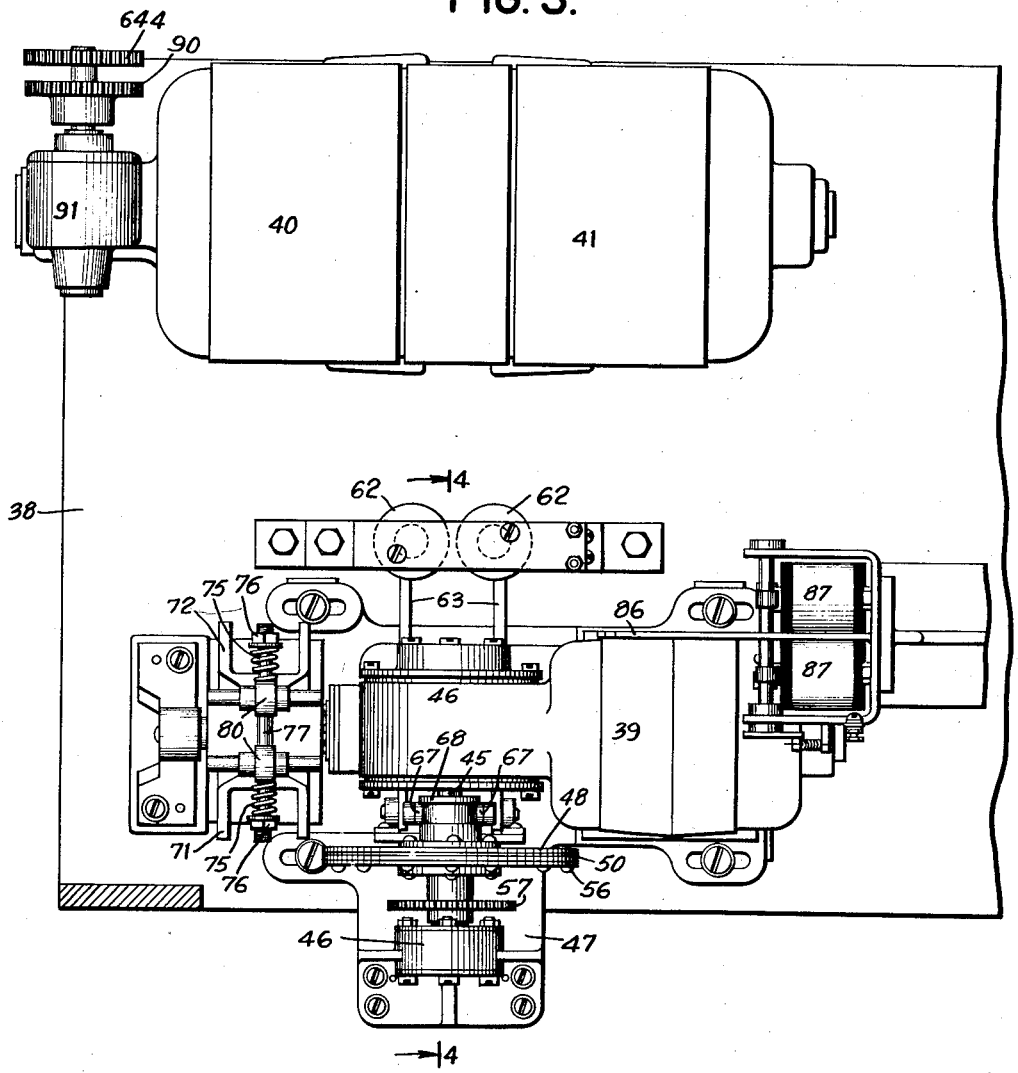
Figure 7:
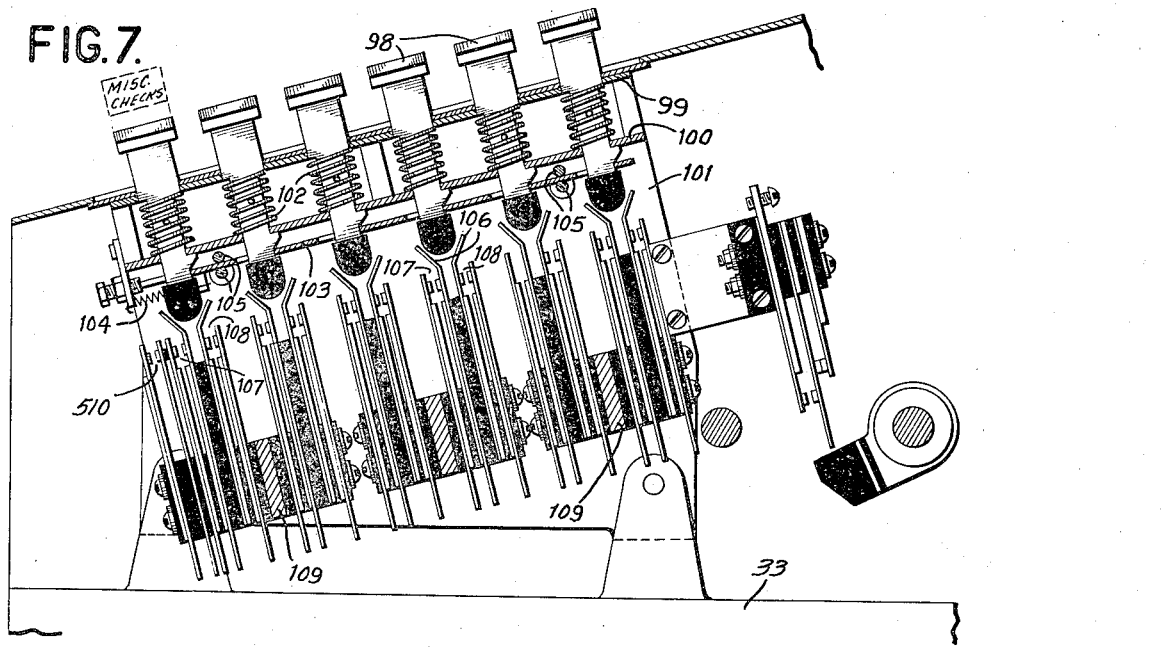
Figure 8:
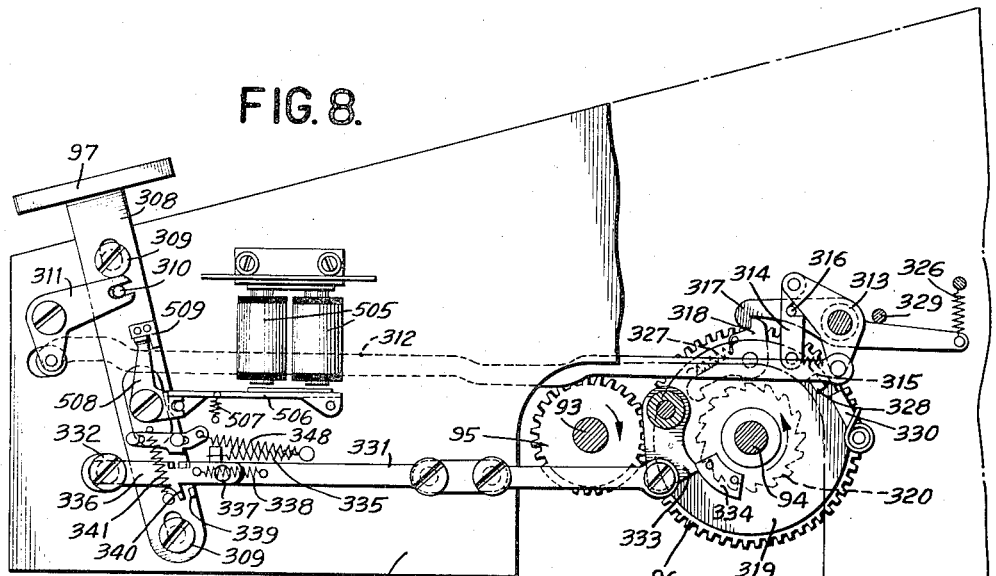
Figure 9:
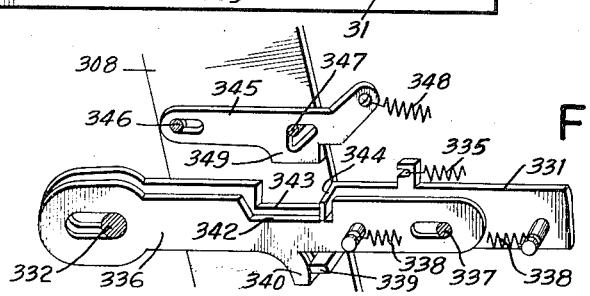
Figure 12:
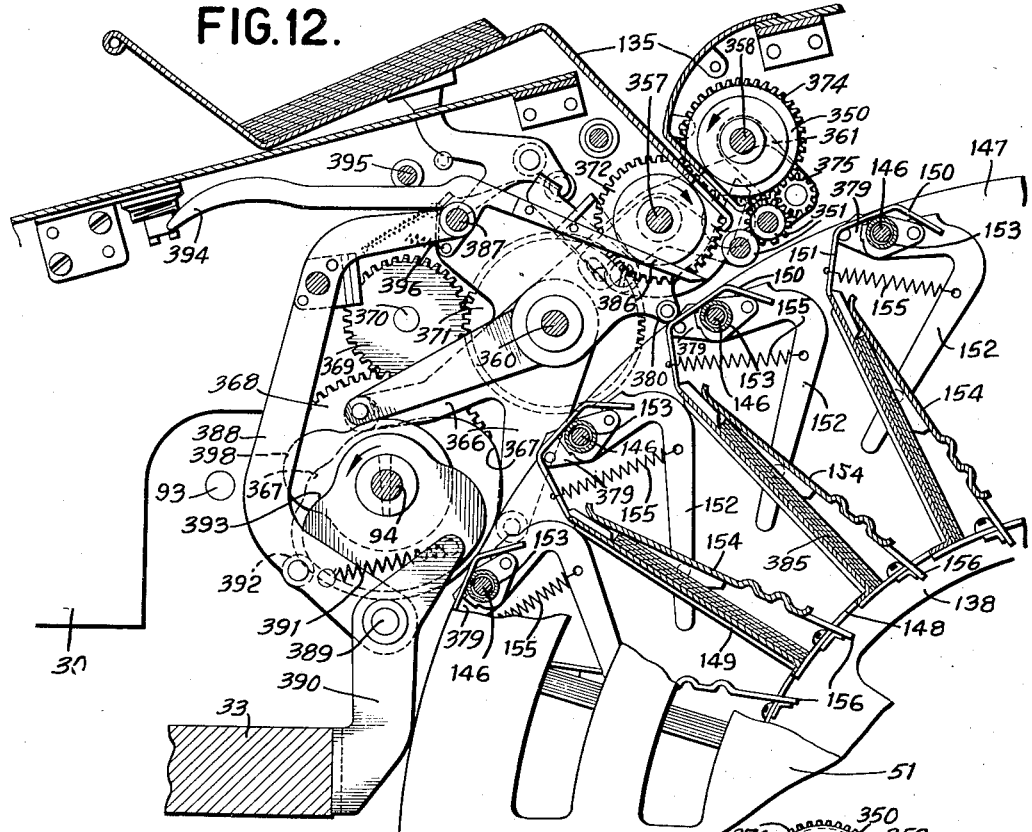
Figure 13:
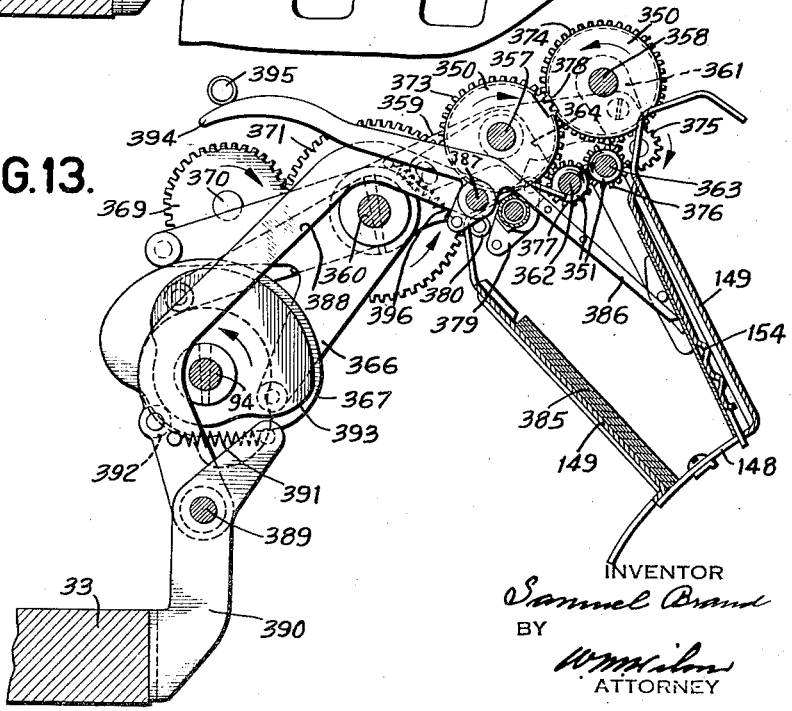
Figure 14:
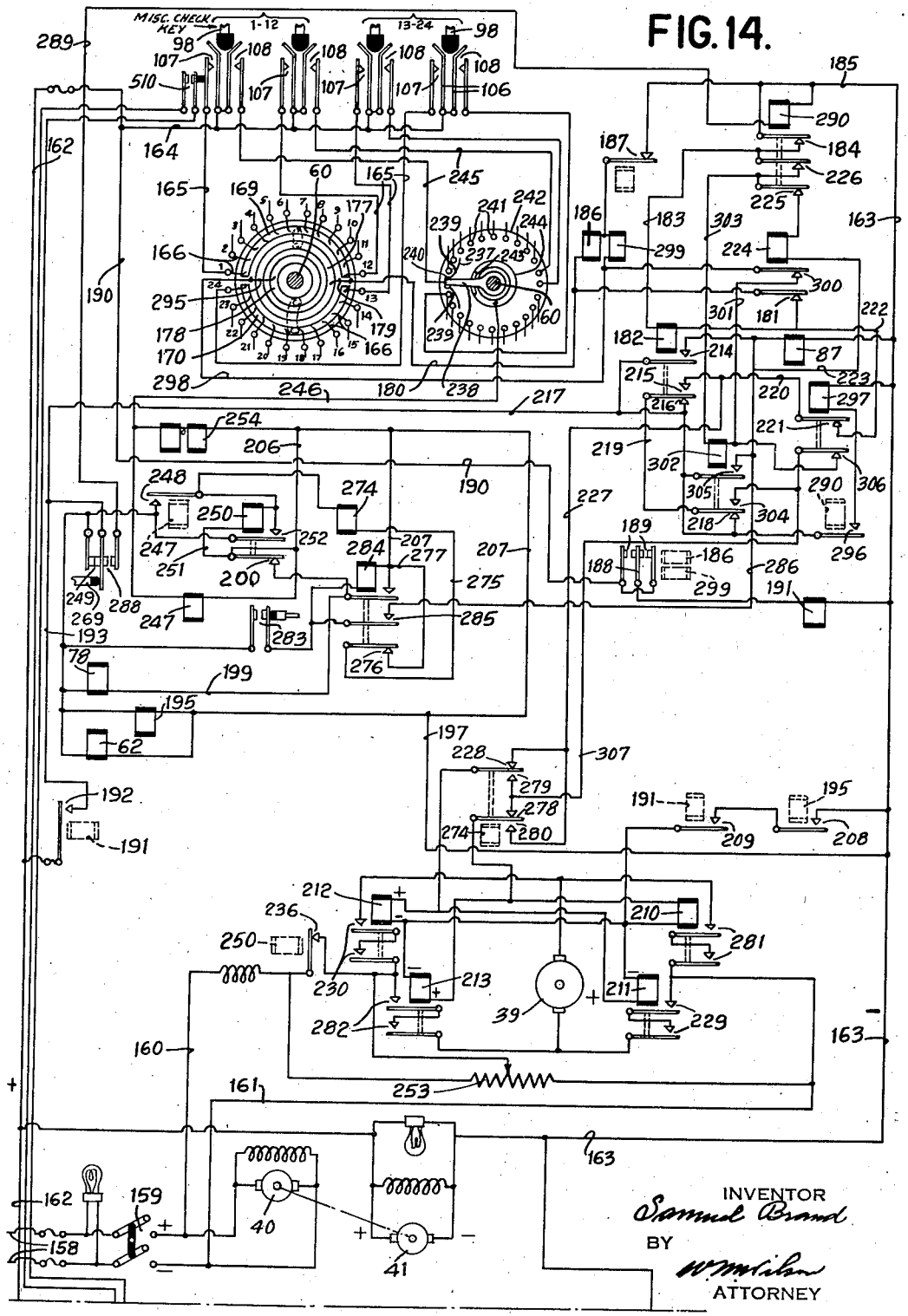
Figure 15:
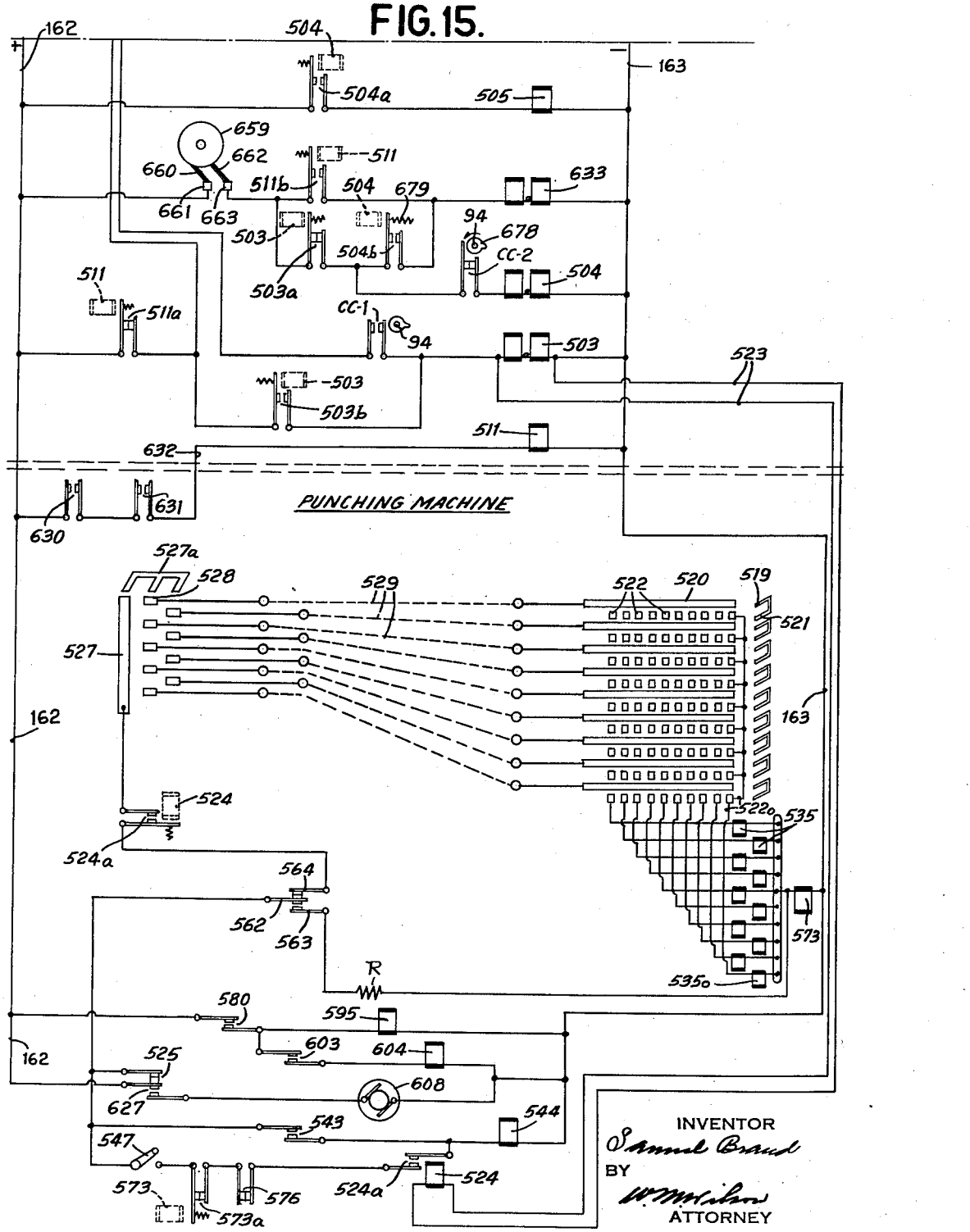
Figure 16:
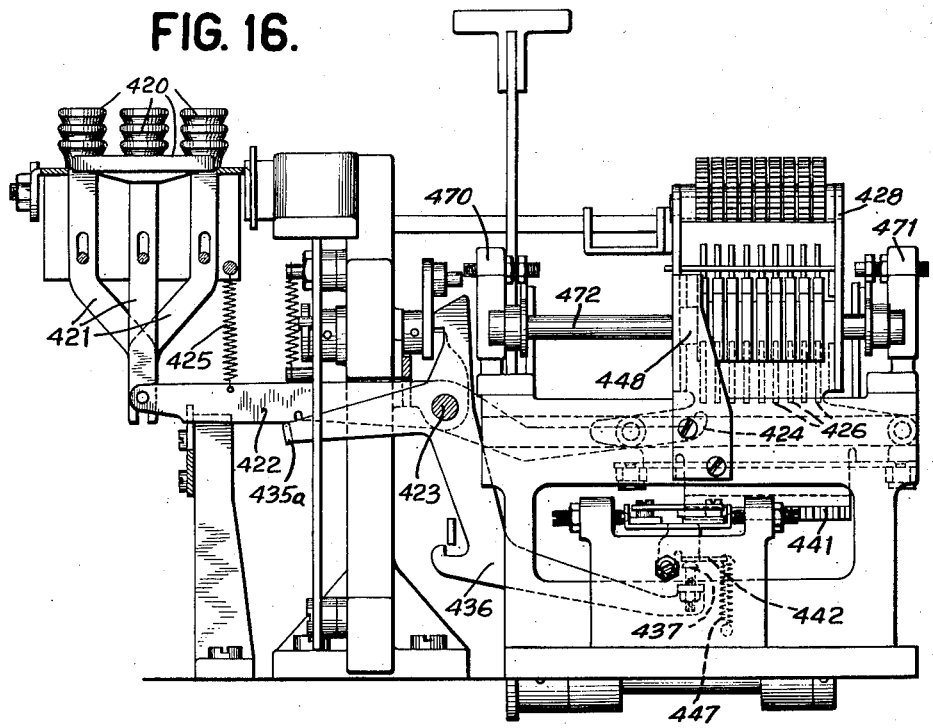
Figure 17:
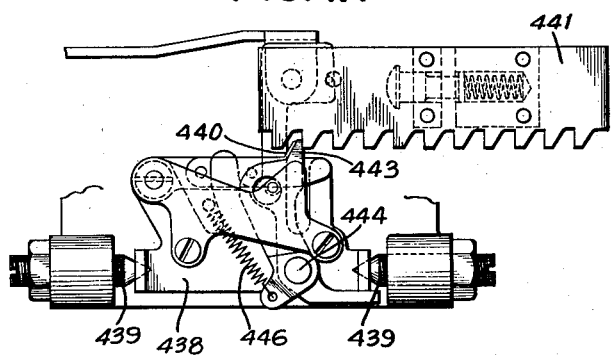
Figure 18:
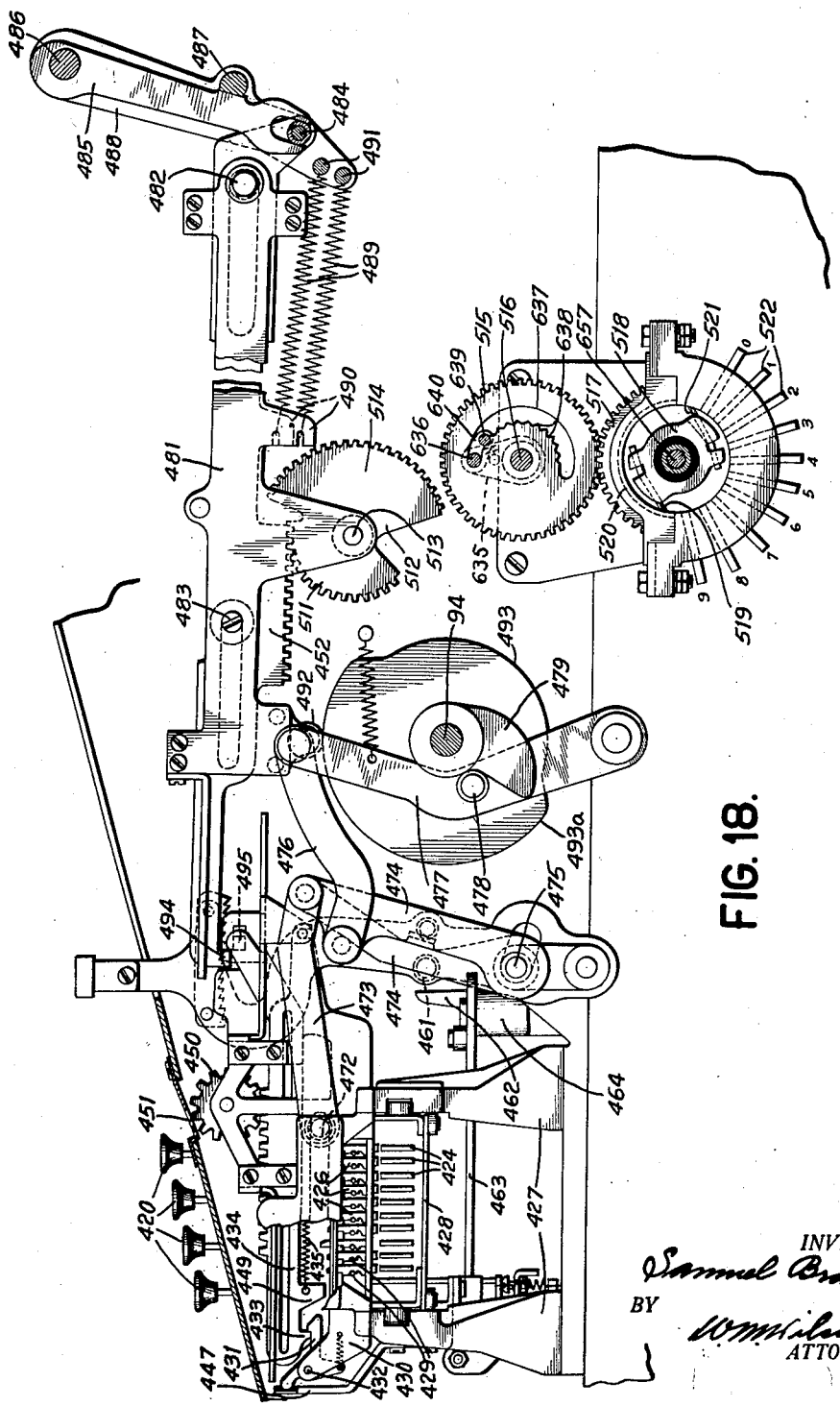
Figure 19:
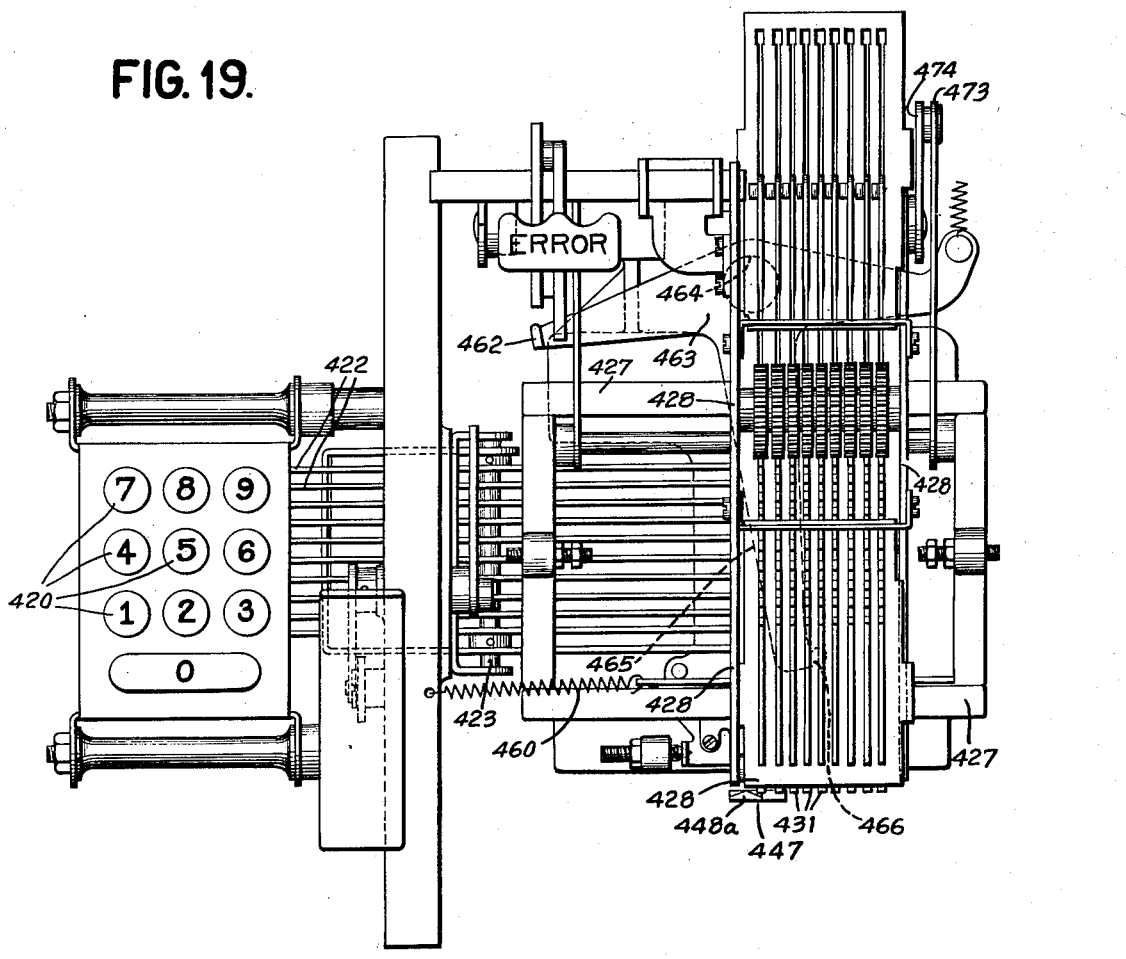
Figure 20:
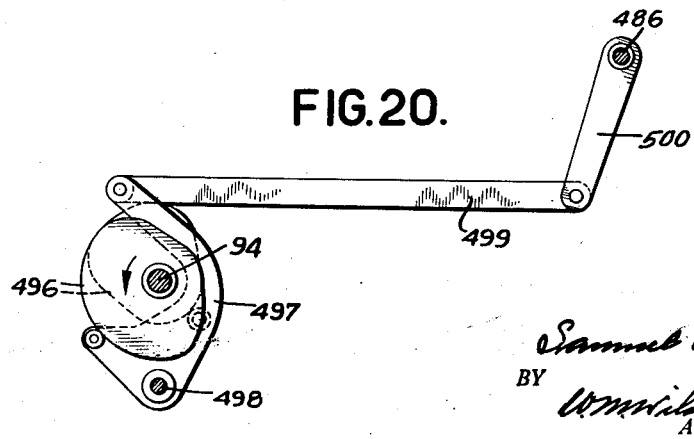
Figure 21:
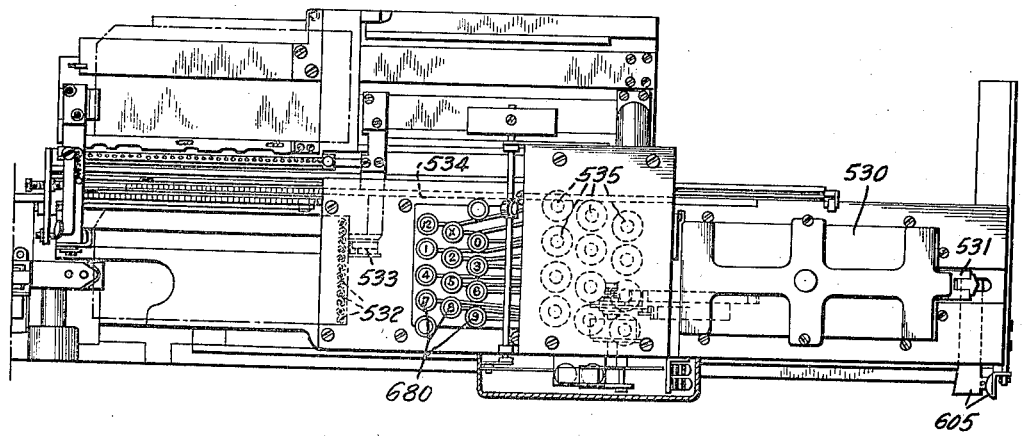
Figure 22:
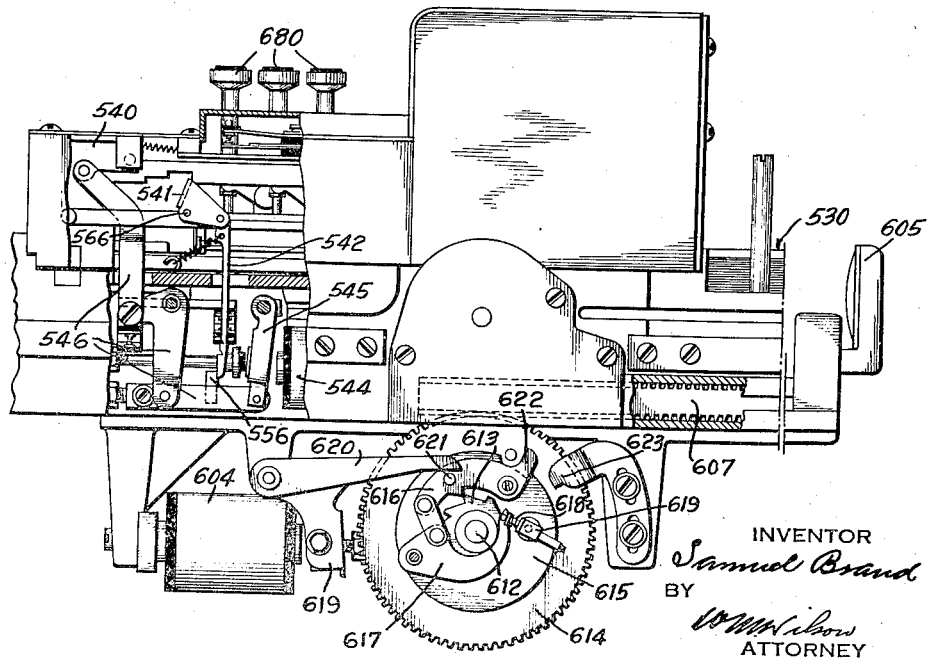
Figure 26:
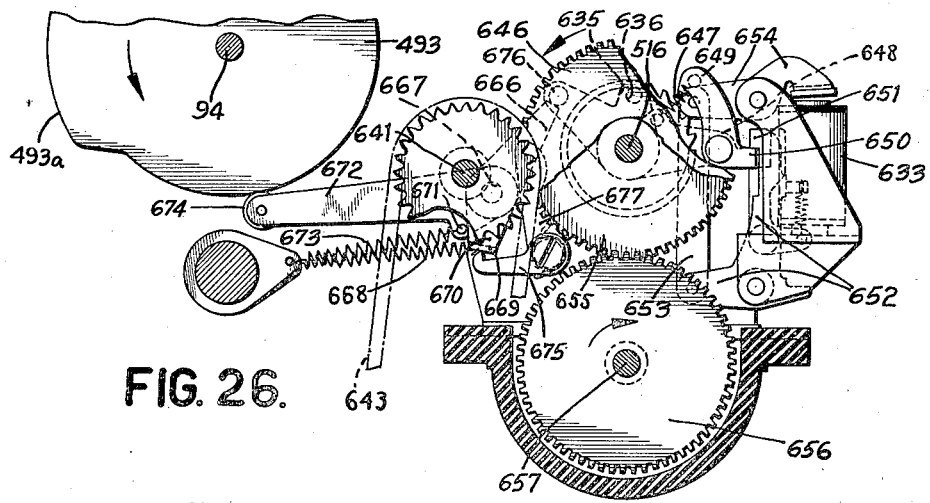
Figure 27:
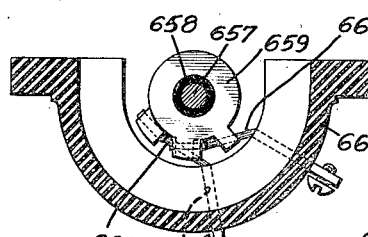
Figure 28:
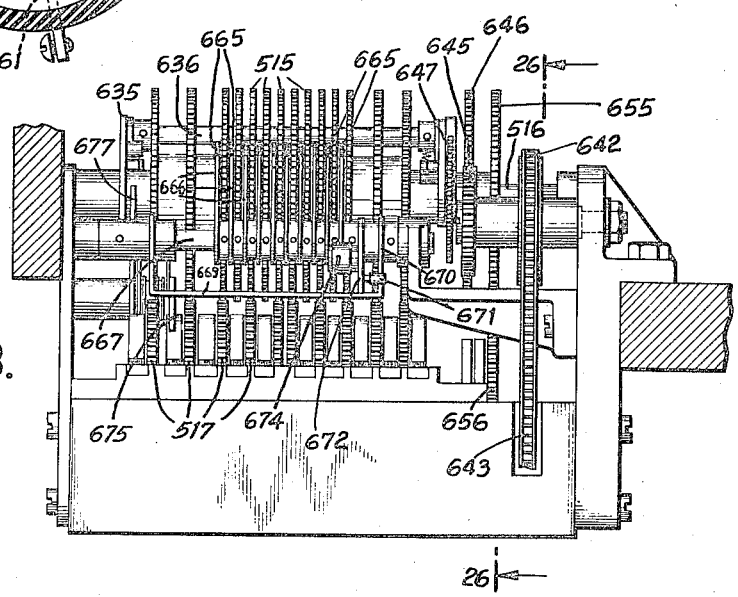

In the drawings:

Fig. 1a is a perspective view showing the check sorting machine at the top of the sheet and the interconnected punching machine at the lower part, Fig. 1 is a view of the right elevation of the machine with the casing removed, Fig. 2 is a detail view of the locking bolt for the sorting drum, Fig. 3 is a top plan view of the driving mechanism for the sorting drum, Fig. 4 is a sectional view taken on the line 4—4 of Fig. 3, Fig. 5 is an enlarged detail sectional view taken on the line 5—5 of Fig. 6 showing the brake for the sorting drum, Fig. 6 is an enlarged view in side elevation of the driving mechanism for the sorting drum, Fig. 7 is a sectional view showing the set up keys for selecting the compartments of the drum and a particular key for selecting the punching mechanism for operation, Fig. 8 is a sectional view of the motor release bar and the one revolution clutch controlled thereby, Fig. 9 is a perspective view showing certain parts of the one revolution clutch control mechanism detached from each other, Fig. 10 is a view in side elevation showing the construction of the feed roller frame, Fig. 11 is a detail view in section showing the construction of the sorting drum and mounting means therefor, Fig. 12 is a detail sectional view of a section of the sorting drum together with the check feeding mechanism with the latter shown in normal position, Fig. 13 is a view similar to Fig. 12 but shows particularly the check feeding mechanism in lowered position, Figs. 14 and 15 taken together with Fig. 14 on top show the electrical circuit diagram of the check sorting machine in Fig. 14 and the top part of Fig. 15 and in the lower part of Fig. 15 the electrical circuits for the punching machine, Fig. 16 is a view in front elevation of the ten-key setting mechanism for setting up the amounts on the checks which are to be punched on cards, Fig. 17 is a detail view of an escapement mechanism, Fig. 18 is a longitudinal sectional view showing the ten-key setting mechanism and associated settable rack devices for setting the electrical commutator units for controlling the punching machine, Fig. 19 is a plan view of the ten-key setting mechanism, Fig. 20 is a detail view of an operating cam and mechanism operated thereby, Fig. 21 is a plan view of the automatic card punching machine, Fig. 22 is an outside view of the punching machine broken away to show certain interior parts, Fig. 23 is a longitudinal sectional view of the punching machine, Fig. 24 is a detail view illustrating certain contact making mechanism of the punching machine controlled by the escapement mechanism, Fig. 25 is a view in side elevation of the left end of the punching machine showing the card ejecting mechanism therefor, Fig. 26 is a sectional view taken on the line 26—26 of Fig. 28 of the resetting mechanism for the commutator units in the check sorting machine, Fig. 27 is a detail view of certain electrical contact making mechanism, Fig. 28 is a front view of the resetting mechanism for the commutator units.

Framework of check sorting machine

The main framework of the check sorting machine includes three longitudinal frames 30, 31 and 32 (Fig. 11) mounted on a sub-base 33 (Fig. 1) which in turn is supported on legs 34. The frames 30, 31 and 32 are joined by a back frame 35. The front legs 34 are joined by a rod 36 and the back legs 34 are joined in a similar manner by a rod 37. These rods support a base or platform 38 (Figs. 1, 3, and 6) upon which is mounted the drum controlling mechanism.

Drive mechanism

Separate electric motors are provided to drive the machine. One of these motors 39 (Fig. 1) drives the sorting drum. The other motor 40 (Fig. 3) drives the check feeding mechanism.

The motor 40 (Fig. 3) also drives a generator 41 directly connected thereto for the purpose of supplying low voltage current to operate the several relays and other electrically operated devices with which the machine is provided and which will be described in detail later in the specifications.

The motor 39 is reversible in order to drive the check sorting drum from the position in which it was left at the last operation through the shorter distance to a selected position.

The sorting drum indicated generally at 51 (Fig. 1) is driven by the motor 39 through a gear 42 (Fig. 4) secured on the armature shaft 43. This gear drives a gear 44 fast on a shaft 45 suitably mounted in a gear housing 46 forming a part of the motor frame, and in a bracket 47. The motor 39 and the bracket 47 are mounted on the base 38 (see also Fig. 3). A clutch disc 48 mounted to slide longitudinally on the shaft 45 but rotatable with shaft 45 through the medium of keys or splines 49, (Fig. 4) is adapted to be brought into contact with a clutch facing 50 mounted on a clutch disc 56 loosely mounted on the shaft 45. The clutch disc 56 is secured to a sprocket gear 57 also loosely mounted on the shaft 45, and, through a chain 58, (Fig. 1) drives a larger sprocket gear 59 secured to a drum shaft 60 mounted in suitable bearings supported in brackets 61 (Fig. 11) extending downwardly from the sub-base 33.

The clutch disc 48 is normally out of contact with the facing 50 and is adapted to be brought into physical contact therewith by the energization of a clutch magnet 62 (Fig. 4). This magnet operates a pair of arms 63 fast on a shaft 64 journaled in a bracket 65. Also secured to the shaft 64 is a yoke 66 (Figs. 4 and 6) the ends of which yoke carry rollers 67 projecting into an annular groove in the hub 68 of the clutch disc 48.

Obviously, when the magnet 62 (Fig. 4) is energized it attracts its armature 69 which is secured to the arms 63 rocking these arms, the sha 64 and the yoke 66 slightly clockwise (as viewed in Fig. 4), shifting the disc 48 into close contact with the facing 50 so that the rotation of shaft 45 is transmitted to the sprockets 57 to frictionally drive the sorting drum.

As will be fully explained later in connection with the description of the circuit diagram, the motor 39 may operate in either direction under the control of the selector keys in order to rotate the sorting drum the shorter distance to the selected position.

A brake mechanism is provided for the purpose of decreasing the speed of the drum as it nears the selected position. This brake mechanism includes a brake drum 70 secured on the armature shaft 43 of the drive motor 39 (see Figs. 3 and 5). A pair of brake shoes 71 and 72 pivoted on a common rod 73 and embracing the drum 70 are provided with suitable linings 74. The brake shoes 71 and 72 normally press their linings against the drum 70 under the influence of springs 75 compressed between retaining nuts 76 on the ends of a rod 77 and the upward extending ends of said shoes 71 and 72. When at the proper time, as will be described later, a brake magnet 78 is energized it attracts its armature drawing a truncated cone 79 mounted on the lower end thereof, upwardly between rollers 80, there being a roller 80 mounted in the bifurcated upper ends of each of the brake shoes 71 and 72, thus spreading the brake shoes and releasing the drum 70 for rotation. At approximately the time the selected pocket is at the desired position the magnet 78 is deenergized which releases the brake shoes for action of their springs 75. This immediately brings the brake lining into effective contact with the drum 70 to stop the rotation of the sorting drum.

In addition to the application of the brake to drum 70, other means is provided to act as an effective brake for the purpose of stopping the drum. This means includes momentary reversal of the current through the field windings of the motor 39. The manner in which this reversal is accomplished will be fully brought out in connection with the description of the circuit diagram. It may also be stated that following the momentary reversal of the current through the motor a resistance is automatically placed in the motor circuit which has the effect of causing the motor to run at reduced speed until the sorting drum is accurately positioned. When this occurs, that is, when the drum 51 is brought to rest in its selected position a locking finger 86 (Fig. 1), which was withdrawn at the beginning of the operation by the energization of magnets 87, is released and its spring 88 rocks said finger into engagement with one of a plurality of spaced alining notches 89 located about the periphery of a ring 85 secured to the drum 51.

The motor 40 (Figs. 1, 3 and 6) as stated above, drives the generator 41 and in addition drives a sprocket gear 90 through reduction gears enclosed in a housing 91. The sprocket gear 90, by means of a chain 91a, rotates a sprocket gear 92 (Fig. 1) secured to a main drive shaft 93 mounted in the frames 30, 31 and 32. The drive shaft 93 rotates continually while the machine is in operation and drives a main cam shaft 94 by means of a gear 95 (Fig. 8) fast on the drive shaft 93 meshing with a larger gear 96 rotatably mounted on the cam shaft 94. A one revolution clutch is provided and is rendered effective, under the control of a release bar 97, to couple the cam shaft 98 to the gear 96 whereby the shaft 94 receives one complete counterclockwise rotation (Fig. 8) at each check feeding and amount set up operation. This clutch and release bar will be described later.

Keyboard for check sorting machine

A brief description will now be given of the various manipulative devices provided for controlling the machine. The sorting drum, indicated generally at 51 (Fig. 1), has twenty-four compartments into which checks may be sorted. In order to select the particular compartment into which the check is deposited and to control the rotation of the drum to bring the selected compartment into position to receive the check a plurality of selector keys 98 (Figs. 1 and 7) arranged in four banks of six keys each is provided. These keys are slidably supported in plates 99 and 100 carried between frames 101 (only one of which is shown) mounted on projections on the sub-base 33. Springs 102 compressed between the plate 100 and the shoulders on the key stems normally hold the keys 98 in the upward position.

The key caps carry suitable indications to designate the compartments according to the classification numbers, letters, etc. of the checks or vouchers to be sorted. For illustrative purposes, however, the keys 98 have been given numbers from 1 to 24 to correspond with the numbers of the compartments on the drum 51.

Upon depression of a key 98 a projection on the stem thereof cams a detent 103 toward the right (Fig. 7) until the shoulders of said projection pass below the detent whereupon a spring 104 restores the detent to latch the key in depressed position. The detent 103 is supported between pairs of rods 105 extending between the frames 101. The depressed key is held by the detent 103 until another key is depressed which shifts the detent releasing the previously depressed key. The keys 98 may not otherwise be released.

Each of the keys 98 carries at its lower end a rounded block of insulation which, upon depression of a key, is thrust between contact blades 106 to close two pair of contacts 107 and 108, there being a set of contacts 107 and 108 provided for each key 98. The blades upon which the contacts 107 and 108 are carried are suitably mounted on bars 109 supported between the frames 101. The contacts 107 and 108 are connected by suitable wires to the sorting drum control device which will be described later.

The sorting drum for sorting checks

It was described above how the shaft 60 (Figs. 1 and 11) is mounted in the frame 33 and how this shaft is rotated by the motor 39 by means of the chain 58. The shaft 60 supports and rotates the sorting drums in the following described manner:

Secured to the shaft 60 are two flanged hubs 136 and 137 (Fig. 11) to the flange of which hubs are secured discs 138 having flanged rims 139. A larger disc 140 is secured to the right hand disc 138 (Fig. 11) and carries near its outer edge a series of lateral projecting rods 146 (see Fig. 12). At their opposite ends the rods 146 are secured to and spaced apart by a ring 147 (Figs. 11 and 12). To form the individual compartments into which the checks are to be sorted light metal plates are secured to the flanges 139 and extend a suitable distance around the circumference of said flanges to form the bottoms as at 148, each of the parts 148 overlapping its neighbor. The plates are then bent outwardly to form radial separators 149 for the compartments. Near their outward extremity the plates are bent toward their respective rods 146, then, passing over these rods, said plates are bent slightly inward, these two bent portions forming apertures 150—151 through which the checks are fed into the compartments. Ears are bent outwardly from the separator plates 149, one near the plate 147 and one near the disc 140 and holes thereof are received by the rods 146 to maintain the separators 149 properly spaced.

Near each end of the rods 146 are pivoted angular arms 152 which arms are joined by sleeves 153 surrounding the rods. Between them each pair of arms 152 pivotally carries a check retainer or clamping plate 154 each pressed against the separator 149 at its left by springs 155 attached to the arms 152. Projections 156 on the lower edges of the plates 154 extend through slots in the bottom of the compartments to limit the movement of the inner edges of said plates 154. The arms 152 are adapted to be swung counterclockwise (Fig. 12) to bring the outer edges of the plates 154 against the right hand separators 149 to permit ingress of the checks. The means for rocking the arms 152 will be described later.

Pins 157 project from the left hand arms 152 (Fig. 11) to provide a convenient means for manually rocking the retaining plates 154 in order to remove the checks from the compartments.

Compartment selection

It was previously stated that the selection of the check compartments in the sorting drum 51 is controlled by depression of the selector key 98 corresponding to the compartment it is desired to bring into position to receive the check. The control of the sorting drum is electrical and will be described in connection with the circuit diagram shown in Fig. 14. Depression of a key 98 completes a circuit which causes the sorting drum to rotate and determines which direction said drum will rotate.

Referring now to the circuit diagram (Fig. 14) current to operate the sorting machine is supplied from lines 158 through a switch 159 which, when closed, energizes the motor 40. This motor runs continually driving the generator 41 and the drive shaft 98 (Fig. 1). Closing the switch 159 also provides current for the motor 89 by means of wires 160 and 161 but this motor does not start until a selector key 98 is depressed due to control relays now to be described. The current for operating the several relays is supplied by the direct current generator 41, the positive lead from said generator being indicated at 162 and the negative lead at 163.

As was set forth previously there are twenty-four compartments in the sorting drum 51 and an equal number of selector keys 98 are provided to select the compartments. The blades of each inner pair of blades 106 (Fig. 7) of the switches operated by these keys are connected by a common wire 164 (Fig. 14) to the positive side 162 of the generator 41. Each of the left blades carrying one of the points of the contacts 107 is connected by a wire 165 to corresponding brushes 166. These brushes are stationary and are mounted in a suitable insulating support 167 secured to the sub-base 38 by a pair of brackets 168 (see Fig. 11). The brushes 166 are constantly in contact with a split commutator comprising separate segments 169 and 170 (Fig. 14) mounted in an insulating disc 176 (Fig. 11) secured to the sprocket 59 which, in turn, is fast on the compartment drum shaft 60. The segment 169 is electrically connected to a ring 177 and the segment 170 is electrically connected to a ring 178 both of which rings are mounted in and rotate with the disc 176.

The commutator segments 169 and 170 have a fixed relationship with the compartment drum and rotate therewith, but rotate with respect to the brushes 166 consequently the spaces between the segments 169 and 170 may be between any adjacent pair of diametrically opposed brushes 166. For the illustrative embodiment it may be noted (see Fig. 14) that one of the spaces separating these segments lies between the brushes corresponding to the No. 1 compartment and the No. 24 compartment, while the space separating the opposite ends of the segments lies between the brushes corresponding to the No. 12 and No. 13 compartments.

Depression of a key 98, for instance the "5" key, closes contacts 107 and completes a circuit from the positive side of the generator line 162 through line 164, contacts 107, the corresponding line 165, brush 166, commutator segment 169, the common ring 177, a brush 179, a wire 180, contacts 181, through the coil of a relay 182, wire 183, contacts 184, wire 185 to the negative generator lead 163. At the same time a circuit is completed through one coil 186 of a two-coil relay, contacts 187, wire 185 to line 163 energizing the relay 186 which attracts its armature 188 comprising the center blade of a three blade time delay switch. This closes one set of contacts 189 completing a circuit from the positive line 162, a wire 190, closed contacts 189, a relay 191 to the negative line 163. Energization of the relay 191 closes its contacts 192 (lower left of Fig. 14) completing a circuit from the line 162, contacts 192, wire 193, normally closed contacts 240 (see Fig. 9), through the brake magnet 79 (see also Fig. 6) the coil of a relay 195 and the clutch magnet 62 (see also Fig. 4).

The circuits through the clutch magnet 62 and the relay 195 are completed by wire 196, 197 and 198 directly to the negative line side 163. The brake magnet 79 circuit is completed through a wire 199, contacts 200, wires 206, 207, 197 and 198 to the negative side 163.

The operation of the brake magnet 79 (Figs. 1, 5 and 6) draws its armature including the member 70 upwardly spreading the brake shoes 71 and 72 thus releasing the brake. Energization of the relay 195 closes contacts 208 (lower right of Fig. 14), closing a circuit from the negative lead 163, contacts 208, contacts 209 closed upon energization of relay 191, to the negative side of motor control relays 210, 211, 212 and 213. The energization of the clutch magnet 62 engages the clutch 46—50 (Fig. 4) between the sorting drum motor 89 and the sprocket drive 57—58—59.

The energization of the relay 182 (Fig. 14) closes contacts 214 and 215, and opens contacts 216 completing a circuit from the positive generator lead 162, contacts 192, wire 217, contacts 218 normally closed, wire 219, contacts 215 now closed by relay 182, wire 220, normally closed contacts 221, wire 222, relay 182, wire 183, contacts 184, wire 185 to the negative lead 163, thus setting up a holding circuit through the relay 182. Another circuit is completed through contacts 192, wires 193 and 217, contacts 214 closed by relay 182, wire 223, relay coil 224, contacts 225, 226 and 184, wire 185 to line side 163. Energization of the relay 224 opens the contacts 181 thus opening the circuit from the commutator to the relay 182 to prevent any cross circuits when the commutator is in motion.

The closing of contacts 214 also completes a circuit through the magnet 87 which energizes this magnet to disengage the arm 86 (Fig. 1) from the notch 89 on the ring 85 thus freeing the drum 51 for rotation.

A circuit is completed at the same time through the contacts 215, a wire 227, normally closed contacts 228 to motor control relays 211 and 212, contacts 209 and 208 to the negative line 163. Energization of motor control relays 211 and 212 close double sets of contacts 229 and 230 respectively completing a circuit through the motor 39 extending as follows: positive side of the main supply line through line 160, normally closed contacts 236, contacts 230, armature of motor 39, contacts 229, wire 161 to the negative side of the main supply line 158 through switch 159.

The clutch is now effective and the motor is running to rotate the selector drum to bring the selected compartments to position which, it will be remembered, is the "5" compartment for this particular example. The drum will continue to rotate until it approaches within two compartments of the selected compartment as determined by the depressed selector key 98. A feeler or extended brush 237 (Fig. 14) carried on the end of an arm 238 (Fig. 11) and extending equal distances on each side thereof is in contact with a selected contact point 241. The arm 238 is fast on the shaft 60 (see Fig. 11) and carries the feeler 237, also a shorter feeler 239. A brush 240 is adapted to successively wipe the contacts 241 mounted in an insulating disc 242 suitably secured to the base 33. There are 24 contacts 241 each electrically connected to the contact 108 associated with a corresponding selector key 98.

The arm 238 also carries a brush 243 in constant contact with a common ring 244 and electrically connected to the feeler 237 and 239 and to the brush 240.

When the "5" key was depressed the contacts 108 corresponding thereto were closed setting up a circuit from the positive lead 162, wire 164, contacts 108, wire 245 to the "5" contact 241. Now as the feelers 237 on the arm 238 which is rotating with the drum 51, contact with the "5" contact 241 the circuit is extended through the feelers 237, brush 243, ring 244, wire 246, through a relay coil 247, wires 206, 207, 197 and 198 to the negative generator lead 163. Energization of the relay 247 closes contacts 248 completing a circuit from the positive lead 162, contacts 192, the previously mentioned normally closed contacts 249 (see Fig. 2), contacts 248, through a relay coil 250, wires 251, 206, 207, 197, 198 to the negative lead 163. This energizes the relay 250 closing contacts 252 thus setting up a holding circuit through said relay 250, and opens the contacts 200 to deenergize the brake magnet 78 which allows the springs 75 (Fig. 5) to apply the brake.

Energization of the magnet 250 also opens contacts 236 throwing resistance 253 in series with the motor 39 thus reducing the speed of the motor.

At the time the feeler brush 237 completed the above described circuit, a circuit was also completed through the "5" contact point 241, as set forth above, through wire 246, a pair of locking bolt magnets 254 (see also Fig. 2), wires 207, 197 and 198 to the negative lead 163.

At the time the feeler brush 237 wipes across the "5" contact however, the drum 51 is in a position between compartments and a bolt 255 (Fig. 2) which is adapted to be operated by magnet 254 strikes the inter-notch periphery of the ring 85 (Fig. 1) and is thus prevented from entering a notch 89 to arrest the movement of the drum and align said drum. The magnets 254 are energized only as long as the feeler brush 237 is in contact with the "5" contact 241.

The bolt 255 (Fig. 2) is slidably mounted on an arm 256 pivotally supported on a plate 257 which in turn is secured to a bracket 258 supported on a cross rod 259 extending between the left hand legs 34 (Fig. 1) of the machine. A pin 260 projecting from the bolt 255 is embraced by the bifurcated upper end of an arm 266 fast on a shaft 267 to which is also fast the armature 268 of the magnets 254 and an arm 269 which operates the sets of contacts 288 and 249. The arm 256 has two opposed ears 270 bent outwardly therefrom in which ears are loosely mounted studs 271 between the inner ends of which is compressed a strong spring 272.

In axial alinement with the outer ends of the studs 271 are two stop screws 272 fast in supporting blocks 273 suitably secured, the upper one to machine sub-base 33 and the lower one on the bracket 258. The bolt 255 may enter a notch 89 only when the drum has arrived at the selected position as will be described later.

When the relay 247 (Fig. 14) operated to close the contacts 248 a circuit was extended from line 162, contacts 192, contacts 249, contacts 248, a relay coil 274, wire 275, contacts 276, wires 277, 207, 197 and 198 to line 163. Energization of the relay 274 opens contacts 228 and 278 and closes contacts 279 and 280. Opening the contact 228 deenergizes motor control magnets 211 and 212 dropping contacts 229 and 230, at the same time closing of contacts 280 extends a circuit as follows: positive lead 162, contacts 192, wires 193 and 217, contacts 218, wire 219, contacts 215 closed by energization of magnet 182, wire 227, contacts 280, through motor control magnets 210 and 213, contacts 209 and 208 to negative lead 163. The magnets 210 and 213 now being energized, close their respective contacts 281 and 282 causing a momentary reversal of the direction of flow of the electrical current through the motor 39 for the purpose of dynamic braking.

When the brake magnet 78 is deenergized and its armature drops, it closes contacts 283 (see also Figs. 5 and 6) setting up a circuit from line 162 (Fig. 14), contacts 192, wire 193, contacts 249, contacts 283, a relay coil 284, wires 207, 197 and 198 to line 163. Energization of relay 284 closes contacts 285 setting up a holding circuit for itself extending as follows: line 162, contacts 192, wires 193 and 217, contacts 214, wire 286, contacts 285, coil 284, wires 207, 197 and 198 to line 163.

The energization of relay coil 284 also closes contacts 287 again energizing the brake magnet 78 to release the brake shoes 71 and 72 (Fig. 5) the upward movement of the brake magnet armature opening the contacts 276 deenergizing relay coil 274 which allows contacts 228 and 278 to close thus restoring the flow of current through the motor 39 to its former direction. The motor continues to run at reduced speed until the drum is in the selected position.

When the drum arrives in the selected position, which in the instant example is the "5" position, the brush 240 on the arm 238 contacts the "5"

point contact 241 and it again completes a circuit through the relay 247 but this relay does not at this time affect the circuit of relay 247 because the relay 250 was previously energized and set up a holding circuit for itself. However the magnets 254 are again energized and since a notch 89 is now opposite the bolt 255 (see Figs. 1 and 2) the magnets 254 rock the armature 268, shaft 267 and arm 266 to slide the bolt 255 into the notch 89. As the drum 51 at this time still has some momentum the bolt 255 and consequently the arm 256 will be carried therewith in the direction of rotation of the drum 51 compressing the spring 272 (Fig. 2) which absorbs the shock and centers the drum accurately in the selected position by retracting the drum to a predetermined position.

The magnets 254 are energized as long as a key 98 is depressed and the drum is standing in the position corresponding to the depressed key. However as soon as another key 98 is depressed the circuit is opened and the magnets 254 are deenergized and a spring 265 withdraws the bolt 255 to permit rotation of the drum to the new position.

Again referring to Fig. 2, the movement of the armature 268 also rocks the arm 269 which opens the contacts 249 and closes contacts 288 (Fig. 14) setting up a circuit extending from line 162, contacts 192, contacts 288, wire 289, relay coil 290, wire 185 to the negative line 163. Energization of relay 290 closes contacts 296 and opens the contacts 184, 226 and 225. Closing contacts 296 sets up a circuit through a coil 297 from the line 162, contacts 192, wire 217, contacts 296, coil 297 to line 163. The coil 297 thus is energized to open the contacts 221 and opens the holding circuit through the relay 182.

The opening of contacts 184, 226, and 225 opens the circuits and allows the relays 182, 224 to assume the normal original position and also prevents back circuits through coils 182, 224 and 186.

Opening the contacts 249 opens the circuit through the brake magnet 78 allowing the brake again to become effective. Also opening the contacts 249 deenergizes magnet 195 which allows the contacts 208 to open thus deenergizing the motor control magnets which in turn drop their armatures to open the motor circuit thus stopping the motor 39. Further opening the contacts 249 deenergizes the clutch magnet 62 to render the clutch 48—50 (Fig. 4) ineffective.

When the magnet 182 is deenergized dropping its armature and opening the contacts 214 the magnet 87 is deenergized (see also Fig. 1) allowing the spring 88 to engage the nose of arm 86 in a notch 89 to aline the drum in the selected position.

With the drum 51, split commutator and the rotor arm 238 standing at the "5" position let it be assumed, as a further example, that the "23" key is depressed.

Depression of the "23" key completes a circuit to the "23" brush 166 which, it will be observed by reference to Fig. 5, is in contact with the segment 170. This sets up a circuit through the "23" brush 166, segment 170, common ring 178, brush 295, a wire 298, a relay coil 299 serving the same purpose as the previously described magnet 186 and has a common outlet through contacts 187 and wire 185 to the line 163. At the same time a circuit is completed from wire 298, through contacts 300, wire 301, magnet 302, wire 303, contacts 226 and 184, wire 185 to the negative lead 163. Energization of the magnet 302 opens contacts 218 and closes contacts 304 and 305, completing a circuit from the positive lead 162, contacts 192 closed upon energization of magnet 299, wires 193 and 217, contacts 216, wire 219, contacts 304, contacts 306, magnet 302, wire 303, contacts 226 and 184, wire 185 to line 163 thus setting up a holding circuit for magnet 302.

Another circuit is completed through contacts 305, wire 223, magnet 224, contacts 225, 226 and 184 to the line 163. The relay magnet 224 opens its contacts 300 thus opening the circuit from the commutator segment 170 to the relay 302 to prevent cross circuits.

The closing of contacts 305 also energizes magnet 87 to remove the arm 86 from engagement with the ring 85 freeing the drum for rotation.

At the same time a circuit is completed through contacts 304, a wire 307, contacts 278 through the motor control magnets 210 and 213, contacts 209 now closed, contacts 208 also closed at this time, to the line 163. The magnets 210 and 213 close their respective contacts 281 and 282 energizing the motor to run in reverse direction. This rotates the drum by the shorter direction directly to the "23" pocket where it is brought to rest in the manner described above.

During the course of this rotation the space between the segments 169 and 170 passes the "23" brush 166 at which time the magnet 299 will be deenergized dropping the armature 188. At this time the armature is shifted to close the left hand (Fig. 14) contacts 189 in order to maintain the relay 191 energized and hold the circuits through contacts 192. This is only for a very brief time after which the segment 169 comes into contact with the live brush energizing magnet 186 which immediately picks up the armature 188 closing the right hand pair of contacts 189 holding the magnet 191 energized. The magnet 186 is energized as long as a key 98 is depressed. However, the motor 39 does not operate because a circuit is also maintained through the magnets 254 to hold the bolt 255 (Fig. 2) in engagement with the drum thus holding the contacts 249 open and the contacts 288 closed. This maintains the magnet 290 (Fig. 14) energized holding the control circuits open.

As soon as another key 98 is depressed the circuit through the magnets 254 is opened which allows the bolt 255 to come out, and closes contacts 249 opening contacts 288. This deenergizes magnet 290 and the machine operates through the above described selecting cycle.

*Motor release bar*

Immediately after depressing the selector key 98 the sorting drum rotates to the selected position. After this operation, the operator depresses the release bar 97 rendering a one revolution clutch (Fig. 8) effective to impart one complete counterclockwise rotation to the cam shaft 94 in the following described manner:

It was set forth above that closure of the switch 159 (Fig. 14) energizes the motor 40 (Figs. 1, 3, and 6) which runs continuously as long as the machine is in operation and which drives the generator 41 to supply low voltage current to operate the machine. The motor 40 drives the shaft 93 (Figs. 1 and 8) continuously but this shaft rotates idly until operation of the clutch mechanism illustrated in Fig. 8 is effected by depression of the release bar 97.

The bar 97 is mounted on a stem 308 which is slidably supported by a pair of headed screws 309 projecting from the frame 31. The stem 308 carries a stud 310 which is embraced by the bifurcated end of one arm of a bell crank 311 having its other arm connected by a link 312 to a lever 313 pivotally supported on the frame 31. Depression of the release bar 97 rocks the bell crank 311 clockwise drawing the link 312 leftward (Fig. 8) thus rocking the lever 313 also clockwise. This raises a link 314 depending from one arm of the lever 313. The link 314 has a shouldered notch in one edge thereof normally held by a spring 315 in cooperative relation with a stud 316 projecting from a retaining pawl 317 pivoted concentrically with the lever 313.

The pawl 317 cooperates with the tail of a drive pawl 318, pivotally carried on a disc 319 secured to the cam shaft 94, to hold said pawl 318 out of engagement with a drive ratchet 320 secured to the gear 96 and constantly rotated thereby in a counterclockwise direction (Fig. 8).

The clockwise movement of the lever 313, imparted thereto by depression of the release bar 97, as above stated, raised the link 314 which, due to the stud 316, rocks the retaining pawl 317 clockwise against the tension of its spring 326, freeing the drive pawl 318 to the action of its spring 327 which immediately rocks the pawl 318 into engagement with the ratchet 320. The disc 319 is now rotated counterclockwise one complete rotation. Shortly after the disc commences its rotation a block 328 secured to the side thereof strikes the lower end of the link 314 and rocks the link clockwise to free the pawl 317 to its spring 326 which rocks said pawl counterclockwise against a stop stud 329. Near the end of the rotation of the disc 319 and of the shaft 94 to which it is fast, the tail of the drive pawl 318 strikes the pawl 317, rocking the drive pawl 318 out of engagement with the ratchet 320 to stop rotation of the shaft 94. A spring pressed pawl 330 cooperates with a notch in the periphery of the disc 319 to prevent retrograde movement of the shaft 94.

Means is provided to hold the release bar 97 in its depressed position until the disc 319 has completed its revolution. This device includes a link 331 slidably mounted at its left hand end (Figs. 8 and 9) on a stud 332 projecting from the frame 31. The right hand end of the link 331 is pivoted to an arm 333 pivotally supported on the frame 31 and normally pressed against a block 334 on the disc 319 by a spring 335.

A slide 336 is slidably mounted on the stud 332 and on a stud 337 projecting from the link 331. A spring 338 urges the slide 336 toward the right (Figs. 8 and 9) but is prevented from shifting the slide due to a stud 339 projecting from the stem 308 of the key 97 abutting against a projection 340 on the slide 336. Upon depression of the key 97 the stud 339 is carried below the projection 340 whereupon the spring 335 draws the slide 336 toward the right until it is stopped by the studs 332 and 337 in which position the projection 340 rests immediately above the stud 339 to prevent restoration of the key 97 by its spring 341.

The upper side of the slide 336 is recessed as at 342 while a recess 343 is provided in the link 331. An ear 344 is bent at right angles from the link 331 and projects into the right hand end of the recess 342 in the slide 336. A coupling pawl 345 carried on studs 346 and 347 projecting from the stem 308 is located in the same plane as slide 336 and said pawl 345 urged toward the right and counterclockwise about the stud 346 by a spring 348, is carried downwardly upon depression of the release bar 97. At this downward movement the left hand end of the pawl 345 receives its full movement but a face 349 comes into contact with and is held in partially elevated position by the ear 344 since the link 331 has not yet been shifted toward the right. The stud 347 has moved downwardly in its triangular slot in the coupling pawl 345. As above stated, depression of the release bar effects a coupling between the disc 319 and the ratchet 320 so that these parts are rotated in unison for one rotation. As soon as the block 344 clears the arm 333 the spring 335 draws the link 331 toward the right carrying the ear 344 from beneath the face 349 and allows the pawl 345, urged by its spring 348, to drop into the recess 342.

Near the end of the rotation of the disc 319 the block 334 engages and rocks the arm 333 clockwise thrusting the link 331 toward the left and, since the coupling pawl 345 is now in the recess 342, the ear 344 on its leftward movement carries the pawl 345 and consequently the slide 336 therewith the pawl 345 sliding over its studs 346 and 347 until the projection 340 clears the stud 339 at which time the release bar is shifted by its spring 341 to its upper position carrying the pawl 345 therewith out of the recess 342. The parts are now in this normal position.

*Check feeding mechanism*

After the drum 51 has been positioned according to the selector key 98 depressed, the check is inserted into an aperture 135 (Fig. 12) and is fed into the selected compartment. The checks are fed into the compartments by means of a plurality of pairs of feed rollers 350 and pairs of smaller rollers 351 (Figs. 12 and 13). These feed rollers normally occupy the position with relation to the sorting drum, in which they appear in Fig. 12, but upon operation of the check feed mechanism to feed a check into a selected compartment, the rollers are rocked to the positions disclosed in Fig. 13. The rollers 350 are secured to the shafts 357 and 358 (Fig. 13), the shaft 357 being carried between a pair of frames 359 (see also Figs. 10 and 11) secured to a shaft 360 journaled in the frames 30 and 31. The shaft 358 is carried between upwardly extending brackets 361 one secured to each of the frames 359. The rollers 351 are carried on shafts 362 and 363 the latter shaft being supported between the frames 359 and the shaft 362 being supported between adjustable brackets 364 pivoted on the shaft 357 and adjustably secured to the frames 359 by screws 365 (see Fig. 10).

Also secured on the shaft 360 is a cam arm 366 carrying rollers cooperating with a pair of cams 367 secured on the shaft 94 (Figs. 10 and 12) which, it will be remembered receives one complete counterclockwise rotation at each operation of the machine. At the proper time the cams 367 rock the shaft 360 and the frames 359 clockwise to bring the rollers 351 into close proximity to the selected compartment and at the same time a gear 368 (Fig. 12) fast on the shaft 94 rotates the rollers 350 and 351 in the directions indicated by the arrows through the following described train of gears: The gear 368 drives an intermediate gear 369 mounted on a stud 370 in the frame 30. The gear 369 meshes with a gear 371 loose on the shaft 360, which gear 371 meshes with a gear 372 (Fig. 10) fast on the shaft 357 back of the frame 359. A gear 373 (Fig. 13) fast to the shaft 357 on the opposite side of the frame 359 from gear 372 meshes with a gear 374 fast on the shaft 358. The counterclockwise rotation of the gear 368 through the train of gears just described rotates the gear 372, the shaft 357 and the rollers 350 fast thereon in a clockwise direction, and the gear 374, shaft 358 and the feed rollers 350 on this shaft counterclockwise. The gear 374 (Fig. 13) meshes with an intermediate gear 375 which in turn meshes with a gear 376 secured on the shaft 363, and the gear 376 meshes with a gear 377 fast on the shaft 362. This causes the feed rollers 351 on the shaft 363 to rotate counterclockwise and the rollers 351 on shaft 362 to rotate in a clockwise direction.

The rollers 350 are notched substantially as shown at 378 (Fig. 13) so that when the check is dropped into the aperture on chute 135 (Fig. 12) the lower edge thereof rests on the shoulders of the notch 378 substantially between the sets of rollers 350. The rotation of rollers 350 and 351 in the direction of the arrows feeds the checks into the selected compartment.

When the selected compartment comes into position an arm 379 integral with the arm 152 comes to rest adjacent a roller 380 (Figs. 10, 12 and 13) on the frame 359. When this frame is rocked by the cams 367, the roller 380 rocks the arms 379 and 152 counterclockwise carrying the retainer plate 154 from the position in which it appears in Fig. 12 to the position in which it is shown in Fig. 13 so that the incoming check may be fed onto the stack 385 in the proper order.

As the checks or other record materials are fed into the compartment they are held closed against the retainer plate 154 by a series of fingers 386 (Figs. 12 and 13) pivotally carried on a rod 387 carried between a pair of arms 388. The arms 388 are secured to a shaft 389 pivotally supported on brackets 390 (only one of which is shown) secured to the sub-base 33. Springs 391 normally urge the arms 388 clockwise pressing rollers 392 one carried by each arm 388, against cams 393 fast on the shaft 94.

When the shaft 94, and consequently the cams 393 are rotated counterclockwise the cams 393 permit the springs 391 to rock the arms 388 quickly clockwise from the Fig. 12 position to the position in which they appear in Fig. 13. As the fingers 386 are carried into the compartment they are guided by tails 394 thereon cooperating with grooves in a rod 395 under the influence of springs 396. After the card is fed in between the tops of the fingers 386 and the retainer plate 154 the cams 393 restore the arms 388 to their original position withdrawing the fingers 386 from the compartment. The cams 367 now rock the frames 359 counterclockwise carrying the feed rollers outwardly to their normal positions and allow the springs 155 to carry the retainer plate 154 against the stack 385 to hold the checks in position.

*Set-up mechanism for controlling punching mechanism*

After a key 98 corresponding to a compartment adapted to receive the check has been depressed, and prior to the depression of the motor release bar 97 the amount of the check is set up in the machine. The purpose of this set-up mechanism is to cause the entry of the amount in a totalizer related to the compartment selected and the printing of the amount on a tape, so that each tape will exhibit all the amounts of the checks inserted in the associated compartment and the totalizer will give the total of such amounts.

The present disclosure will be confined to the utilization of the set-up mechanism for controlling the punching on a card of these amounts, whereby each of a series of miscellaneous checks of various classifications may have an individual punched card. These miscellaneous checks are all sorted in one compartment since for their separate classifications there is an insufficient number of compartments.

For a complete description of a totalizing and printing mechanism for the check sorting machine to perform the functions previously described, reference should be had to the patent to F. L. Fuller, No. 1,966,623, dated July 17, 1934.

The ten-key controlling mechanism for setting up amounts represented on the checks to be sorted is best shown in Figs. 16–19, inclusive, and so much of this mechanism as is necessary to understand its correlation with the punching mechanism is disclosed and described herein.

The machine includes ten numeral keys 420 which are arranged in a conventional ten key keyboard arrangement and upon the protruding ends of the slidable key stems 421. Each key stem 421 (Fig. 16) has a pin and slot connection to key levers 422 pivoted on a rod 423 so that when a key stem is depressed the extremity 424 of the key lever 422 is raised and against the action of a spring 425.

In the differential mechanism the stops 426 are arranged in transverse series in which all the stops in each transverse series (Fig. 16) represent the same digit, and the stops are also arranged in longitudinal series (Fig. 18) in numerical order, and all the stops are capable of being selectively set to limit the movement of actuating devices.

As best shown in Fig. 18 slidably mounted in horizontal standards 427 is a frame 428 through which the extremities 424 of the key levers 422 project so as to selectively actuate and elevate a stop 426 of the longitudinal series by the depression of a key. The stops 426 are carried by said frame 428 and are guided by upper and lower plates of the frame 428 (see Fig. 18). The stops 426 are raisable and will be retained in elevated position by pins 429 of a spring urged detent plate 430, there being one detent plate 430 for each longitudinal series of stops 426.

Pivotally mounted at 432 on each detent plate 430 is a spring urged hook or latch member 431 engaging a shoulder 433 of a rack 434 slidably mounted in the frame 428. A spring 435 attached to the rack 434 urges the latter to the right to cause the normal engagement of the hook of the latch 431 with the shoulder 433. Obviously, as a stop 426 is raised the notch therein will by its cooperation with the pin 429 force the detent plate 430 to the left against the action of a spring connected thereto and through the hook 431 the rack 434 will be shifted slightly to the right against the action of spring 435, and the pin 429 therefor retains the raised stop 424 in elevated position, as is shown for the raised digit stop 424 in Fig. 18 having the numerical value of "2".

Underlying each key lever 22 is a bail 435a (Fig. 16) for operating an escapement mechanism and said bail has a projecting portion 436 carrying a screw 437 which is adjustable for timing the operation of the escapement mechanism shown in detail in Fig. 17.

The escapement mechanism comprises a plate 438 pivoted by trunnions 439 and integral with the plate 438 is an escapement dog 440 normally below an escapement rack 441 carried by the frame 428. During the downward depression of a key the screw 437 being below an integral extension 442 (Fig. 2) of the plate 438 will rock the same about its pivot raising the dog 440 so as to engage a tooth of the rack. At the same time an escapement dog 443 pivoted at 444 to the plate 438 is lifted out of engagement with the tooth it previously engaged and which is now engaged by the dog 440. The dog 443 now being above the plane of the rack 441 will be rocked clockwise by its spring 446 to overlie the next tooth space of the rack 441. During the restoration of the depressed key a spring 447 will return the plate 438 and dog 440 will now be shifted below the rack 441 and dog 443 will now be in cooperation with the successive tooth space. The frame 428 now being released by the dog 440 is now shifted by a normally tensioned spring 460 (Fig. 19) connected to the frame 428 one tooth space of the rack 441 under control of the dog 443. This form of escapement mechanism is well known and is only generally described herein.

Referring to Figs. 16 and 19 a fixed plate 448 is provided with a camming portion 448a which is adapted to rock the latch arm 431 (see Fig. 18) with which it is in cooperation unlatching it from the rack 434 which is then shifted by the related spring 435 until a shoulder 449 of the rack abuts the raised stop 426. Each rack 434 meshes with a gear 450 having thereon numeral indicia visible through a slot 451 so that the numerical value of the previously depressed key is exhibited.

In this manner successive digits are set up under control of the ten keys 420 to control the differential position of racks 452.

After the setting of the stops 424 has been utilized the raised stops are depressed to normal and the carriage returned to normal by the following means. Guided in slots in side frames 470 and 471 (Fig. 16) is a rod 472 to which is connested links 473 (Fig. 18) which are connected to arms 474 pivoted at 475. To one of said arms 474 there is connected a link 476 connected to an arm 477 carrying a roller 478 in engagement with a profile cam 479 secured to the aforementioned drive shaft 94. When said shaft is turned under control of a depression of the motor release bar 97 previously described the cam 479 will cause the rod 472 to be moved to the left to engage with the upper bevelled portions of the raised stops 424 thus depressing them to normal position and also thereafter engaging the shoulders 449 of the racks 434. The latter are moved back by the rod 472 to normal position where they are relatched by the latch arms 431.

For returning the frame 428 to normal position where it is held in such position by the escapement mechanism one of the arms 474 carries a pin 461 (Fig. 19) which engages an upward extension 462 of a bell crank 463 pivoted at 464 (see Fig. 19). The arm 465 of the bell crank 464 engages a pin 466 carried by the frame 428 and as the bell crank 463 is rocked the frame 428 will be returned to normal position and thus retensioning the spring 460 (Fig. 19).

*Rack operating mechanism for setting commutator units to control punching machine*

Referring to Fig. 18 the racks 452 are slidably mounted in a frame including plates 481 having their right ends pivoted to embrace the stud 482. The left hand ends of the racks 452 are slotted and are slidably mounted by these slots by a rod 483 carried by the side plates 481 of the rack frame.

Each of the racks 452 carries a stud 484 at its right end which stud is embraced by the bifurcated end of an arm 485 loosely pivoted on a shaft 486.

The arms 485 are normally pressed against a bail rod 487 carried between a pair of arms 488 secured to the shaft 486 by springs 489 stretched between projections 490 at the lower sides of the racks 452 and rods 491 carried between the arms 488.

One of the frame plates 481 carries a roller 492 which by the weight of the frame engages the profile of a cam 493 secured to the shaft 94. During the rotation of the cam 493 the left end of the frame drops to bring projections 494 of the racks 452 into correlation with square studs 495 carried by the now differentially positioned racks 434 so that by the movement of the racks 452 to the right urged by the springs 489 under control of the bail rod 487 the racks 452 will move to the right until each projection 494 strikes the correlated stud 494.

The rocking movement of the bail rod 87 is effected by the following described means illustrated in Fig. 20. It includes a pair of complementary cams 496 fast on the shaft 94 cooperating with rollers carried by a curved arm 497 pivotally supported on a rod 498. A link 499 connects the curved arm 497 with an arm 500 secured to the rod 486. At each rotation of shaft 94 the cams 496 rock the arm 497 first clockwise and then through the link 499 rock the arm 500, rod 486 and the bail rod 487 counterclockwise, until the racks 452 are stopped in differential positions. The bail rod 487 continues its counterclockwise movement after the racks 452 are arrested and thus merely stretching the springs 489.

The cams 496 then merely reverse this movement, rocking the arm 500 counterclockwise and through the link 499 rock the shaft 486, the arms 488, and rod 487 clockwise to restore the racks 452 to their normal position.

*Lock for motor release bar*

Referring to Fig. 14 it will be recalled that when the generator 41 is rotated by motor 40 by closure of switch 159 current will be supplied to line wires 162, 163 in both the check sorting machine (Fig. 14) and the punching machine (see Fig. 15).

Referring to Fig. 15 it will be seen that the initial supplying of current to line wires 162, 163 for the check sorting machine will close the following circuit, from line wire 162, contact point 661, brush 660, disc 659 electrically connecting brush 660 with a brush 662, contact point 663, relay contacts 503a now closed, cam controlled contacts CC—2 now closed, and a relay magnet 504 in the punching machine to the line wire 163. The normal energization of the relay magnet 504 by supplying current to line wires 162, 163 will cause the closure of relay contacts 504a to close a circuit to energize a release bar locking magnet 505 in the check sorting machine (see Fig. 14). In the present description a relay magnet will be designated by a numeral and the associated relay contacts by the same numeral with a sub-script, *a*, *b*, *c*, etc., to show better the correlation of relay magnets and controlling relay contacts.

Referring now to Fig. 8 it will be seen that the armature 506 of said magnet 505 is drawn by a spring 507 when the magnet is deenergized to rock a bell crank 508 beneath a bar 509 attached to the stem 308 of the motor release bar 97 thus normally locking the motor release bar 97. When the magnet 505 is energized by circuits just explained the motor release bar 97 is unlocked. Hence when the machine is not in use the motor release bar 97 is locked.

*Means for selecting punching machine for operation*

As previously stated the compartment selecting key 98 related to the sorting compartment which receives all the checks of miscellaneous classifications also selects the punching machine for operation. This is effected by the depression of such a selector key 98 (or it may be a number of keys) which controls the rotation of the drum to select the compartment receiving the miscellaneous checks.

This particular key, as best shown in Fig. 7 at the left is adapted to close contacts 510 together with the other contacts 107 and 108. Referring to Fig. 14 when the contacts 510 in the check sorting machine are closed by the depression of the miscellaneous check key 97 a circuit will be closed at this point in the check sorting machine described as follows: from line wire 162 (Fig. 15), through relay contacts 511a now closed, key controlled contacts 510 now closed, through cam controlled contacts CC—2 now open through the relay magnet 503 to the other line wire 163.

The cam which controls contacts CC—1 is carried by the shaft 94 so that when this shaft is rotated by the depression of the motor release bar 97 its closure at or about 180° of the rotation of the cam will close the circuit to the relay magnet 503, causing its energization. It will thereupon open its relay contacts 503a to deenergize the relay magnet 504. The latter now being deenergized will permit its relay contacts 504a to open causing the locking magnet 505 to be deenergized and as shown in Fig. 8 spring 507 will rock the bell crank 508 to locking position when the stem 308 is raised to normal.

As shown in Fig. 15 the energization of the relay magnet 503 will cause the closure of stick relay contacts 503b and thus relay magnet 503 will be retained energized even after contacts CC—2 open. Since relay contacts 503a are retained opened, relay magnet 504 is retained deenergized, relay contacts 504a are retained opened, and locking magnet 505 is retained deenergized, thus keeping the motor release bar 97 locked until the completion of the card punching operation.

However, if the operator so desires another selecting key 98 can be operated to cause the rotation of the drum after the check has been sorted in the miscellaneous compartment and the keys 420 may be depressed after the shaft 94 has completed its operation. However, motor release bar 97 will be retained locked until the card has been completely punched and ejected out of the punching machine.

*Commutator units to control punching machine*

Referring now to Fig. 18 it will be seen that meshing with the racks 452 are teeth 511 of double segments 512 pivoted by a rod 513 carried by the side plates or frame 481. The teeth 514 of said segments mesh with gears 515 loosely pivoted on a shaft 516 when the frame 481 drops under control of the cam. At this time, it will be recalled that racks 452 are being set to the right to differential positions so that gears 515 are commensurately set. Each gear 515 meshes with a gear 517 to which is secured a commutator arm 518 carrying a brush 519 meshing with a commutator segment 520 and a brush 521 meshing with a particular commutator point 522 depending upon the position of the arm 518 (see also Fig. 15). Since the cam 493 elevates the frame 481 during the return of the racks 452 the brushes 521 will remain in their differentially set positions in contact with selected points 522. For punching a "0" the brush 521 of a commutator unit turns clockwise one step, for "3" turns four steps clockwise and so on, as determined by the keys 420 depressed.

*Card punching machine*

The card punching device herein illustrated is of the type shown in the patent to Fred Lee and George Daly, No. 1,976,618 dated October 9, 1934 and only so much of the operation thereof will be explained as is necessary for an understanding of the operation in connection with the present invention. In general the punch contains a feed magazine 530 (Figs. 21 and 23) from which the cards are fed singly from the bottom of the stack by a picker 531 which feeds the cards to a position under the punches 532 (Fig. 23) with the first column of the card in position to receive perforations. From this position the card is engaged at its rear edge by a pusher 533 mounted upon an escapement rack 552 which for each operation of the punches permits the advance of the card step by step. A series of magnets 535 is adapted to select the punches for actuation in the following manner. Associated with each magnet 535 is a pivoted armature 536 whose free end is connected to a rod 537 which through a bell crank 538 moves an interposer bar 539 to the left in Fig. 23 where it cooperates with a punch bar or plate 540. The forward movement of any interposer bar 539 is adapted to rock a bail 541 which in Fig. 22 is shown as being connected to a spring pressed depending link 542 whose lower free end is adapted to engage and close contacts 543. This, as is well explained in the aforementioned patent and which will be explained later herein, is adapted to close a circuit through a magnet 544 which through its armature 545 and link and bell crank connections 546 is adapted to draw downwardly on the pivoted punch bar or plate 540 to force the selected interposer against the associated punch thus perforating the card.

The circuit for the magnet 544 extends in the punching machine from the line side 162 (Fig. 15), through contacts 525 now closed, contacts 543, magnet 544 to the line side 163.

In the present application each magnet 535 for punching a digit is connected to the series of contact points pertaining to the same digit (see Fig. 15). For example, the punch magnet 535o for punching the digit "0" is connected by a wire 522o to the series of points 522 pertaining to this or zero digit so that by a circuit connection to be described this magnet will be selected for punching the card in a column a hole representing "0".

The circuit involved in this selection is shown in Figs. 14 and 15 wherein it will be seen that by line wire connections 523 from the check sorting machine to the punching machine, a relay magnet 524 is in parallel connection with the relay magnet 503 and energized simultaneously therewith to cause the closure of relay contacts 524a (Fig. 15), extending a circuit from the line side 162, contacts 525 now closed, circuit breaker contacts 562—564 now closed, relay contacts 524a now closed, a contact bar 527, movable column contact element 527a, contact point 528, plug connection 529 to the segment 520 of the first commutator unit to be selected for control by the movable column contact element 527a carried by the carriage. The circuit then extends by the brush 519, brush 521, contact point 522 to the magnet 535, and then to the line side 163 through a space relay magnet 573 thus causing the energization of the latter and the selected punch magnet 535.

The column selector for punching comprising elements 527, 527a and 528 is well known in the art and is fully shown in Fig. 23 at the left and is more completely described in the patent to G. F. Daly et al., #2,016,706 dated October 8, 1935.

There are as many magnets 535 as there are index-point positions in the card column and each commutator unit is connected to a punch operating magnet 535 associated with a punch 532 for the corresponding index-point position. It will be understood that whenever a magnet 535 is energized it will effect depression of the corresponding rod 537 and will in a well known manner force its interposer 539 to the left (Fig. 23) until the end of said interposer overlies the selected punch 532 and is underneath the punch operating plate 540. At the same time the rockable bail 541 having an edge extending into notches formed in all the interposers 539 will be rocked counterclockwise (Fig. 23) to draw up an operating link 542 which will close the pair of contacts 543 thereby energizing punch operating magnet 544 (Fig. 23). Energization of said magnet causes it to attract its armature 545 drawing a link to the right (Fig. 22) thereby rocking the bell crank 546 counterclockwise to draw down a link pivoted to the punch bar 540. As a consequence of the end of the selected interposer 539 being interposed between the bar 540 and the selected punch 532 said punch 532 will be depressed and will make a perforation in the appropriate index-point position of the blank record card 548 (Fig. 23).

When the bar 540 is depressed in the foregoing fashion, the left end of the selected interposer will, of course, be depressed thereby rocking a bail 549 in a counterclockwise direction (Fig. 23) to raise an escape dog 550 (Fig. 24) and depress a locking dog 551 into engagement with the escapement rack 552, the relation of the dogs being such that the locking dog 551 engages a tooth in the escapement rack 552 before the dog 550 becomes fully disengaged from said rack. The dog 550 is pivotally mounted upon an extension of a shaft 553 supporting the bail 549 (see Fig. 23) and has a slot, the left end of which abuts said shaft. Said dog also has an enlarged hole cooperating with a pin 554 fixed to a short arm carried by the shaft 553 and is normally spring urged toward the left by a spring 555 interposed between a fixed part of the frame and a tail formed in the dog.

When the shaft 553 is rocked by the bail 549, the arm fixed in said shaft carrying the pin 554 will be rocked clockwise (Fig. 24) to raise the dog 550 and disengage the nose of said dog from the rack, prior to which, however, the locking dog 551 will engage a tooth of the rack. As soon as the nose of dog 550 clears the tooth of rack 552 which the dog engages, the spring 555 will draw the dog 550 to the left (Fig. 24) so that the nose of said dog will overlie the space between the next adjacent tooth to the left (Fig. 24) of the one in which the nose of said dog formerly engaged.

When the magnet 544 (Fig. 22) is energized, a projection 556 extending upwardly from and carried by the link urges the lower end of the hook 542 to the right (Fig. 23) so that about the time the armature 545 reaches the limit of its movement to the right the hook 542 will become disengaged from one of the spring contact members carrying the contacts 543 so as to permit said contacts to open immediately thereby deenergizing the magnet 544 which will then release its armature allowing a spring 557 (Fig. 23) to rock the plate 540 upwardly and permit the selected interposer 539 to rise and thereafter be restored to normal position by means of a spring 558.

As a consequence of the deenergization of the magnet 544, the bail 549 will rock clockwise to its normal position shown in Fig. 23 and the dog 551 will be raised to release the rack 552 which will then move one column space to the left (Fig. 23) or to the right (Fig. 24) by the usual spring barrel. Since the dog 550 overlies the interdental space between the next two adjacent teeth to the left (Fig. 24), said dog will ride into said space and prevent the rack 552 from escaping more than one tooth space which corresponds to the distance between columns of the record card.

It will thus be seen that each time one of the commutator units is read out, one of the magnets 535 will be energized and will select a punch 532 for operation, the punch selected corresponding, of course, to the setting of the commutator.

It is desirable that the circuits through the magnets 535 be broken after the magnet 534 has been energized to operate a selected punch or punches and that said circuits remain open until the carriage has completely escaped one column space so that premature energization of the magnets 535 may be prevented. For this purpose there is provided mechanism illustrated in Fig. 24 and which is fully shown and described in the patent to W. F. Gutgesell, #1,939,049.

Pivotally mounted on the shaft 553 adjacent the dog is a member 559 having a transverse lug 560 overlying the upper edge of the dog 550 so that when said dog is raised by the pin 554 as described the member 559 will be rocked clockwise (Fig. 24). The member 559 has a pin 561 underlying a block of insulating material carried by a spring contact member 562 which is common to two other contact members 563, 564, the contact members 562, 563, and 564 being mounted upon and insulated from a fixed part of the machine frame and so disposed that when the parts are in the position shown in Fig. 24, the contact studs of the members 562, 564 engage one another. When the dog 550 is raised by the pin 561 by consequence of the rocking of bail 549 counterclockwise (Fig. 23) the member 559 will be rocked clockwise (Fig. 24) thereby raising the pin 561 and causing the contact studs of members 562, 563 to engage each other, thereby breaking the circuit through the contact studs of the members 562, 564.

The arrangement of the contact members 562, 563, and 564 is such that contact studs in members 562, 563 touch each other before the studs in members 562, 564 break contact so that the circuit through member 562 is never broken down as a consequence of the rocking of dog 550. In order to hold the members 562, 563 in contact with each other until the carriage has fully escaped there is provided mechanism controlled by the rockable bail 541 which holds the pin 561 in elevated position until the dog 550 has been rocked back into engagement with the next adjacent tooth in rack 552. This mechanism comprises a T- shaped member 565 fixed upon a shaft 566 upon which is fixedly mounted the bail 541.

Pivotally mounted on the shaft 566 is a spring operated member 567 having a lug 568 which normally engages the left side (Fig. 24) of a transverse lug 569 forward in the member 559. The member 567 is normally in the position shown in Fig. 24 with its operating spring holding a bent-over lug 570 in said member in engagement with a lug 571 formed in the T-shaped member 565, the spring operating member 567 being interposed between a lug 572 in the member 565 and the left edge of lug 568 in member 567.

When the bail 541 is rocked counterclockwise due to the leftward movement of one of the punch interposers 539 (Fig. 23), the T-shaped member 565 will be rocked clockwise as in Fig. 24 but the lug 568 will be held by the lug 569 and prevented from movement as a consequence of which the spring interposed between the lugs 572 and 568 will be tensioned. After the bail 541 has rocked far enough to close the contacts 543 the magnet 544 will be energized thereby rocking the bail 549 and shaft 553 in a clockwise direction as shown in Fig. 24 to raise the dog 550 and rock the member 559 clockwise.

As a consequence of this movement the lug 569 will be carried upwardly and will clear the lug 568 which, it will be remembered, is held stationary by the lug 569 during the rocking of the bail 541, as described, so that the spring between lugs 572, 568 will cause the lug 568 to snap under the lug 569 and prevent the member 559 from being restored when the dog 550 rides down into the next tooth space to the left (Fig. 24) and will be held in this position until the bail 541 is restored to normal position (Fig. 23).

As a consequence of deenergization of the punch magnet 544, the bail 549 will rock clockwise (Fig. 23) and the selected interposer 539 will be restored by its spring 558 thereby permitting the bail 541 to rock back to its normal position as shown in Fig. 23, or in a counterclockwise direction as in Fig. 24.

The lug 568 is so proportioned that it will not clear the lug 569 in member 559 until the bail 541 has reached its home position. Consequently, the contacts 562, 564 cannot reclose until bail 541 has been permitted to return to its normal position, which, of course, will not happen until the selected interposer has likewise returned to its normal position. The contact members 562, 564 are connected in the circuit to the magnets 535 (see Fig. 15) so that it will be clear that the magnets 535 cannot be energized during the period in which the spring contact members 562, 563 are in contact with each other.

The magnets 535 have a common connection to a bus bar to which is connected the spring contact member 563 through a suitable resistance R so that magnets 535 and contact member 564 are connected in series and also in parallel with the contact 563 across the line wires 162—163 (Fig. 15) through the relay magnet 573.

When the relay magnet 573 is energized it opens contacts 573a which are in series with a pair of contacts 576, the relay contacts 573a, contacts 576 and relay contacts 524b being in parallel relation with the contacts 543.

The contacts 576 are arranged to be normally closed and are similar to contacts 36 fully described in Patent No. 1,939,049 hereinbefore referred to and, as they are not directly involved herein, it will be presumed that such contacts remain closed.

The above described mechanism is precisely the same as shown and described in the patent to W. F. Gutgesell, 1,939,049 and the present machine also has incorporated therewith the automatic spacing feature also described in this patent by means of which the carriage is stepped in increments automatically by merely energizing the magnet 544.

In setting up a number, for example, 9.25, six highest orders of the nine commutator units are not set since only three keys 9, 2 and 5 are depressed. The commutator units are read out starting from the highest denominational order and for these orders there may be no setting and as the column selector moves step by step there is no energization of the magnet 544. In such instances by a special circuit magnet 544 is energized and will cause automatic spacing without punching until a commutator unit is read out which is set at zero or some other digit positions.

As explained in the Patent #1,939,049 associated with a manual space key is an interposer bar 539a (Fig. 23) which has a notch 582 to prevent the operation of the "9" punch 532 (as it overlies the "9" punch) when the plate bar 539a is depressed by the energization of the magnet 544. The interposer 539a underlies the punch plate 540 and overlies the bail 549 at all times.

The purpose in having the left end of the interposer 539a underlie the punch plate 540 at all times is to make it possible to effect spacing movements of the card carrying carriage solely through the medium of an energization of the punch magnet 544. It will be obvious, of course, that whenever the punch magnet 544 is energized in a manner later to be described, the punch plate 540 will be drawn downwardly thereby depressing the interposer 539a and causing the rocking of the bail 549 as described before thereby effecting a spacing operation of the carriage.

The operation of the punching mechanism when columns are unpunched will now be described in detail.

Whenever a commutator unit has been set, one of the magnets 535 will be energized and the machine will operate in the manner already described to effect punching of the corresponding index-point position in the same column of the blank record card 548. The relay magnet 573 is designed to operate faster than the punch selecting magnets 535 so that before a selected magnet 535 can operate its associated interposer 538 to close contacts 543, the contacts 573a will be opened with the consequence that a perforation will be made in the blank card according to the setting of the commutator unit and, of course, the carriage will escape to the next column.

The lifting of the dog 550 causes the contact members 562, 563 to make contact without, however, breaking the circuit through contact members 562, 564 until the circuit has been established through the members 562, 563 with the consequence that the magnet 573 will not be deenergized so that contacts 573a will remain open. When the contacts 562, 564 again close after the carriage has fully escaped, the circuit will be reestablished through a magnet 535 without breaking the circuit through the relay magnet 573, provided the next commutator unit is set to zero or other digit.

If it should happen that a commutator unit is not set, no circuit will be established through a magnet 535 with the consequence that the relay magnet 573 will be deenergized and the contacts 573a will close thereby establishing a circuit through the punch magnet 544 which will immediately attract its armature and cause the carriage to escape one column space in the manner previously described.

The magnet 573 is purposely made quick acting in order to open the contacts 573a and hold them open so as to prevent energization of the punch magnet 544 before the selected interposer 539 has become fully moved to the left (Fig. 23) at which time, of course, the contacts 543 will be closed by the rocking of bail 541 in the usual manner.

The foregoing construction enables the punching device to be controlled successively by the commutator units to effect the automatic spacing of the card step by step even if a commutator unit has not been set, as occurs for some higher denominational orders. The final step by step movement of the carriage punches the digits of the lower orders, with the unit denominational order punched last and at which time a skip bar may be utilized to cause the carriage to be skipped for the remainder of the card.

*Carriage skipping mechanism*

It is believed to be unnecessary to describe this skipping mechanism as it is well known and fully shown and described in the patents to Schaaff #1,426,223 and N. L. Reed, #1,962,750 it only being necessary to understand that after punching the number the carriage is skipped to the last column position to close contacts 580 (Fig. 24). When the rack 552 occupies the last column position a projection 581 (Fig. 24) thereof is adapted to close and maintain contacts 580 closed.

The present machine is also provided with a card ejecting mechanism and a power driven card feeding mechanism so that a new card is fed to the carriage after the punched card has been ejected. These mechanisms are also well known in the art and are shown in the patents to Lee & Daly, #1,976,618; F. M. Carroll, #1,976,600 and H. L. Reed, #1,962,750 and for this reason are only generally explained herein. The card ejecting mechanism is shown in Fig. 25 and is set in operation by closure of contacts 580 which cause as shown in Fig. 15 the energization of the ejection control magnet 595. The operation of the card ejecting mechanism is described as follows:

*Card ejecting and card feeding mechanism*

Stated generally, the gripper comprises a pair of jaws 583 and 584 (Fig. 25) urged together by a flat spring 585 but the abutment of a pin 586 with the upper jaw 583 separates the jaws in order that the punched card may be received by the slit-like separation. The card occupies a position between the jaws at the termination of the punching of the last columns of the card.

The gripper is pivotally mounted on a shaft 587 to which is secured a gear 588 adapted to be driven by a gear 589 through an idler gear. Meshing with gear 589 is a slidably mounted rack 590 the extremity of which terminates in an adjustable cylindrical plunger 591. During the previous restoration of the card carriage the end of rack 552 engaged plunger 591 to shift rack 590 to the left against the tension of a spring 592. This caused a clockwise movement of shaft 587 through the train of gears 588—589 to bring the gripper unit to the position shown in Fig. 25, whereupon a latch lever 593 engaged a shoulder 594 of the lower jaw 584. Incidentally, a certain amount of compression was stored up in spring 592. Shifting of latch 593 is effected by energization of the magnet 595 which attracts its armature 596 when the magnet is energized. This causes a shifting movement of a link 597 to the right and by means of a cam shoulder 598 an arm 599 secured to the pivot shaft of latch 593 will rock the latter.

This will result in the release of spring 592 to cause the counterclockwise rotation of the gripper unit. As the jaw 583 leaves pin 586 spring 585 will act to close the jaw 583 upon the lower jaw 584 thus securely gripping the card and flipping the same in reversed position. A stationary pin 600 may suitably coact with one of the jaws to separate them, permitting the released card to fall into a receptacle 601. As the card is ejected, shifting of rack 590 by spring 592 will cause a square shoulder 602 to engage and close contacts 603. Since contacts 603 are now closed as well as contacts 580, it will be seen from Fig. 15 that a circuit will be completed to a clutch control magnet 604 to energize the latter.

It will now be made clear that after the card has been ejected the motor restoring mechanism will be set into operation to automatically restore the card carriage without attention of the operator.

In Fig. 21 the picker 531 is connected through a handle 605 to a rack 607 (Fig. 22) which handle may be actuated to the left to introduce a new card from the magazine 530 to punching position.

Secured to the underside of the base of the machine is a motor 608 (see Fig. 23) having a coupling connection to a stud shaft 609 to which is secured a worm 610 meshing with a worm wheel 611 secured to a shaft 612 one end of which has secured thereto a ratchet-shaped clutch element 613 (Fig. 22). Loosely mounted on shaft 612 is a gear 614 meshing with teeth on the underside of rack 607 and to which gear is secured a disk 615. Pivoted upon the disk 615 is an arm 616 having a single clutch tooth. The free end of arm 616 is connected by a link to a toggle plate 617, the end of the toggle plate distant from its pivot being articulated to a rod 618, slidably mounted in a member 619a pivoted upon the disk 615. The parts are spring held in the position of Fig. 22 which they occupy normally. By virtue of this construction rod 618 and plate 617 act as a toggle, the spring acting to impositively hold the tooth of arm 616 in or out of engagement with the clutch teeth of ratchet wheel 613.

For the purpose of effecting the clutching action, the magnet 604 is provided and when energized attracts an armature 619 so that an arm 620 engaging the pin 621 of arm 616 will rock the tooth thereon into engagement with ratchet wheel 613. Through the connecting link the toggle connection will be moved centrifugally to its other position wherein the spring on rod 618 will act to hold the clutch tooth in engagement with the ratchet teeth. Gear 614 will thereupon be driven in a counterclockwise direction substantially a single revolution, shifting rack 607 to the left just as if it were caused by movement of handle 605. This will similarly result in moving the card pushers and fingers to control the positioning of the cards.

At the termination of the counterclockwise movement of gear 604, a tail 622 will strike a projection 623 of a fixed plate to effect the disengagement of the arm 616 and ratchet wheel 613 by a reverse action.

Also secured to the pivot of armature 619 is an arm 624 (Fig. 23), the free end of which is adapted to bear upon an insulating block to open contacts 525 when magnet 604 is energized. Contacts 525 are retained open by a latching bell crank 625 which is adapted to be struck by bent-up plate 626 secured to gear 614 at the termination of the driving movement of the latter. Below contacts 525 are motor-control contacts 627 which are latched closed upon energization of magnet 604 to complete the motor circuit to motor 608 (see Fig. 15) and are unlatched to stop the motor at the termination of the driving operation in the manner just described.

*Resetting devices for commutator units*

Referring to Fig. 15 there is disclosed two sets of contacts 630 and 631 in series with each and which are located in the punching machine. Contacts 630 are similar to contacts 603 in Fig. 25 and are closed in the same manner but do not show in this figure as they are adjacent contacts 603. Also contacts 631 are similar to contacts 580 in Fig. 24 and are closed simultaneously when the card carriage is in the last column position. From contacts 631 there is a wire connection 632 between the punching machine and check sorting machine to the relay magnet 511 which is in the check sorting machine and connected to the negative line side 163 in the check sorting machine.

As best shown in Fig. 15 energization of the relay magnet 511 will open relay contacts 511a opening the circuit to the relay magnet 503, thus causing relay magnet 503 to be deenergized in the check sorting machine and the relay magnet 524 in the punching machine. At this time relay contacts 503a and 503b, in the check sorting machine close and open respectively and relay contacts 524a and 524b in the punching machine now open. While contacts 503a close they are slow to close and before they do close conducting disk 659 has moved brushes 660, 662 away from the contact points 661, 663, as will be later apparent, so that relay magnet 504 is not energized to permit closure of relay contacts 504a and energize magnet 505 to unlock the motor release bar at this point in the machine operation.

The closure of relay contacts 511b will complete a circuit from the line side 162, through contact point 661, brush 660, conducting disk 659, brush 662, contact point 663, closed relay contacts 511b, to a reset clutch control magnet 633 to the line side 163, causing magnet 633 in the check sorting machine to be energized.

Referring particularly to Fig. 18 it will be seen that attached to the shaft 516 on which the gears 515 are loosely mounted are arms 635 carrying a rod 636 which projects through arcuate slots 637 of the gears 515. One edge of the slot is formed with aligning teeth 638 engageable by a spring pressed aligning rod 639 carried by arms 640 pivotally mounted on the rod 636. The spring pressed rod 638 holds the gears 515 in normal or shifted position to prevent their accidental displacement.

As will be explained later, the shaft 516 is the reset shaft of the machine and is rotated one revolution in a counterclockwise direction to rotate the commutator units. When a gear 515 is rotated counterclockwise to set a commutator unit it will be seen that the extremity of the slot 637 normally engaging the rod 636 will be away from the rod 636 and as shaft 516 rotates the rod 636 engaging the ends of the slots of the commutator units that have not been set will rotate them a single revolution to bring them back to their starting points.

For those commutator units that have been set the rod 636 will pick up the variously set gears 515 rotating them more or less to bring these commutator units back to normal starting position.

Referring to Figs. 25 and 26 on a stub shaft 641 there is loosely mounted a ratchet wheel 642 having a chain connection 643 to a constantly rotating ratchet wheel 644 (see Fig. 3). Sleeved to the ratchet wheel 643 is a gear 645 (Fig. 26 only) meshing with a gear 646 to which is secured a ratchet clutch wheel 647 (Fig. 26), and as will be understood constantly rotates.

To the shaft 516 there is secured an arm 648 pivotally carrying a spring pressed clutch pawl 649. The latter has an extension 650 normally engaging a shoulder 651 of a clutch control bell crank 652. The latter has a link connection 653 to an extension of the armature 654 of the magnet 633. This form of one revolution clutch is well known and for this reason its construction and operation is only generally described herein.

When the magnet 633 is energized by the circuit connections previously described its armature 654 will elevate link 653 rocking bell crank 652 to withdraw the shoulder 651 from the extension of the clutch arm 649 which is now rocked by its spring to engage the ratchet wheel 647. The latter will now rotate the shaft 516 to reset the various commutator units.

At the completion of the revolution of shaft 516 the bell crank 652 will have been restored to normal since in the meantime magnet 633 has been deenergized by means to be subsequently explained so that as the revolution is completed the shoulder 651 will engage the extension 650 of the clutch pawl and thus cause it to be rocked out of engagement with the ratchet wheel 647.

Referring to Figs. 25, 26, and 27 it will be seen that secured to the reset shaft 516 there is a gear 655 meshing with a gear 656 loosely mounted on a shaft 657 which loosely carries the brush carrying arms 518 (see Fig. 18) of the commutator units. Connected with the gear 656 by a sleeve 658 (Fig. 26) of insulating material is the disk 659 carrying the brush 660 normally engaging the contact element 661 and the brush 662 normally engaging the contact element 663. From Fig. 15 it will be seen that an impulse is transmitted to the clutch control magnet 633 through this contact device so that as the shaft 516 rotates through the gears 655—656 the brushes 660—662 will be carried away from their respective contact points 661—663 breaking the circuit to the magnet 633.

In the meantime the contacts 630 and 631 have been opened due to the fact that the card carriage in the punching machine has been restored so that relay magnet 511 has been deenergized to cause its relay contacts 511b to open, thereby opening the circuit to clutch control magnet 633 at such relay contacts 511b.

Obviously even if the circuit of magnet 633 is closed at one point by the contact devices shown in Fig. 26 at the end of the revolution of shaft 516, the magnet 633 will not be re-energized due to the opening of relay contacts 511b thereby permitting only a single revolution of the shaft 516.

*Overthrow preventer for resetting devices*

Referring to Figs. 25 and 26 it will be seen that at the normal position of the gears 515 pins 665 (Fig. 26) carried thereby abut the extremities of stop arms 666 secured to a rod 667. A spring 668 attached to a bail 669 attached to the rod 667 rocks the rod 667 to retain the stop arms 666 in position to abut the pins 665 and also to cause the arm 670 of the bail 669 to engage a pin 671 carried by an arm 672 loosely pivoted on the rod 667. Said arm is drawn by a spring 673 so that a follower 674 carried thereby engages the profile of the cam 493.

During the initial rotation of the cam 493 the cam portion 493a will strike the roller, rocking arm 672 downwardly and by pin 671 rock bail 669 counterclockwise until it is latched by an arm 675 thus holding the arms 666 out of engagement with the pins 665 thus releasing the gears 515 for rotation in setting up the commutator units.

During the resetting operation a pin 676 carried by an arm 635 (Figs. 25 and 27) will engage an extension 677 of the spring urged latch arm 675 rocking it to release the bail 669, whereupon spring 668 is effective to rock the stop arm 666 into position so as to be contacted by the pins 665 when the gears 515 are at their normal positions, thus preventing their overthrow in resetting operations.

*Unlocking motor release bar when resetting is completed*

This occurs as is evident in Fig. 15 when the contact device 659—663 comes to normal position after the resetting operation at which time the circuit extends from line side 162, through said contact device, relay contacts 503a now closed, cam contacts CC—2 now closed, and relay magnet 504 to the line side 163. The energization of magnet 504 permits its relay contacts 504a to close and causes as previously described the energization of the magnet 505 for the unlocking of the motor release bar 97, which has been locked all the time during the punching operation. The motor release bar can now be depressed to cause the punching of another card if the proper compartment selector key 98 has previously been depressed.

*Resetting of commutator units if a card is not to be punched*

It is evident that for each amount entry effected by the keys 420 (Fig. 18) that the amount of such entry is set up in the commutator units whether or not a card is to be punched.

To cause their resetting so as to condition them to normal the following means is operative if a card is not to be punched.

Referring to Fig. 15 it will be seen that cam contacts CC—2 are opened by a cam 678 carried by the shaft 34 at approximately 220° rotation of the shaft at which time the commutator units have been set. This opens the circuit to relay magnet 504 which is normally closed from the line side 162, contact device 659—663, relay contacts 503a now closed, cam contacts CC—2, relay magnet 504 to the line side 163. Relay magnet 504 now being deenergized momentarily it permits a spring 679 to close the relay contacts 504b previously opened by the energization of the relay magnet 504. This extends the circuit from the line side 162, through contact device 659—663, relay contacts 503a now closed, relay contacts 504b now closed, reset clutch control magnet 663 to the line side 163. As previously stated the energization of magnet 663 will cause resetting of the commutator units.

*Punching of classifications of the miscellaneous checks on the punched card*

It will be obvious that after the check sorting machine has been utilized for the sorting of checks with the various classifications and for the feeding of checks of miscellaneous classifications in the associated compartment that in such compartment the checks will be deposited in the same order in which they are fed thereto. Furthermore, by means of the punching machine the punched cards relating to the checks of the miscellaneous classification will be deposited in the hopper 601 in the same order that the checks of the miscellaneous classification are fed to the compartment receiving the checks of the miscellaneous classifications.

At the termination of the check sorting and punching operations the operator may withdraw the checks from the compartment receiving the checks of the miscellaneous classification and also the punched cards from the hopper 601. Such punched cards are reinserted in the feed magazine 530 and by manipulation of keys 680 (Figs. 21, 22, and 23) the classifications of the miscellaneous checks which are printed on the checks may also be punched upon the cards.

Further operation of the system consists in sorting these punched cards according to their classifications and then placing the sorted cards in a conventional tabulating machine. The operation of the latter will then prepare a list allocating the items of checks of the same classification together whereby at the termination of the tabulating machine operation there will be provided the desired lists.

It will be obvious therefore that the incorporation of the punching machine attachment greatly enhances the utility of the check sorting machine and renders it capable of meeting commercial requirements not possible heretofore.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a system of the class described, the combination with a key-controlled record sorting machine comprising check sorting compartments and means under control of keys for selecting said compartments and means for feeding checks to the selected compartments, of a punching machine comprising punching means and means for causing said punching means to punch cards to represent amounts represented by the records, and means including one of said keys for causing the automatic operation of said punching means for punching a card designating an amount represented by the record deposited by said feeding means in the compartment selected by said key.

2. In a system of the class described, the combination with a check sorting machine comprising sorting compartments, power driven means under control of keys for selecting said compartments, and means for feeding checks to said compartments, of a card punching machine for punching cards designating amounts represented by said checks, manually controlled means in said check sorting machine for effecting the operation of said check feeding means, means controlled by the last-named means and one of said keys for causing the automatic operation of said punching machine, and means for locking said manually controlled means against a subsequent operation until said punching machine has completely punched the card while permitting said power driven means to select a compartment under control of another key.

3. The combination with a check sorting machine comprising; key-controlled means for selecting check sorting compartments, key controlled means in said check sorting machine for setting up amounts represented by said checks, and manually controlled means in said check sorting machine for feeding checks into the selected compartments; of a card punching machine controlled by the second of said key controlled means for punching on a card an amount represented on a check, means for causing said manually controlled means to initiate the operation of the card punching machine and means controlled by said punching machine for locking said manually controlled means against a subsequent operation until the card punching machine has completed its operation while permitting during the operation the operation of the key controlled means for selecting a compartment related to a following check and also permitting the operation of the key controlled means for setting up an amount represented by the check next to be sorted.

4. In combination with a key controlled record sorting machine having selectable sorting compartments and provided with means for feeding records into selected sorting compartments and means for setting up amounts represented by the records sorted, of a separate punching mechanism for punching a card under control of said setting means digit by digit in successive columns, and means in said record sorting machine for causing the operation of the check feeding means to feed a record to a selected compartment and for causing concomitantly the automatic initiation of the operation of said punching mechanism under control of the amount setting means to punch a card to represent the amount of the record fed in the selected compartment.

5. The combination of structure set forth in claim 4 and including in combination, means in said record sorting machine for automatically locking said feeding means after one operation thereof to prevent a second operation of said record feeding means, and means in said punching mechanism and controlled thereby for disabling the locking means in said record sorting machine when the said punching mechanism has completely punched the card.

6. In a combined record sorting and punching machine provided with sorting compartments for sorting records and means including keys for selecting said compartments, the combination with supplemental keys, of means controlled by said supplemental keys for setting up amounts represented on the records sorted, a punching mechanism controlled by the last-named means for punching on cards the amounts represented by the records, and means including one of the first-named compartment selecting keys for causing the automatic operation of the punching mechanism and for causing the punching mechanism to be controlled by the amount setting means.

7. In a combined record sorting and punching machine, record sorting compartments, means including a plurality of keys for selecting said compartments according to the classification of records and a special key for selecting a compartment adapted to received records of miscellaneous classifications, key controlled means for setting up amounts represented by the records, a card punching mechanism controlled by the last-named means, and means including said special key for causing the automatic operation of said punching mechanism under control of said amount setting means.

8. In a combined punching and sorting machine including a series of sorting compartments selected for receiving records according to their classifications, means for feeding records representing amounts in said compartments, a punching device for punching on a card an amount represented by a record, a special key for selecting a compartment for receiving records of miscellaneous classification, manually controlled means for setting up the amounts represented by each record for controlling said punching device, and means including said special key for rendering said punching device operative under control of the manually controlled means for punching cards designating amounts represented only by each of the records of miscellaneous classification.

9. In a combined sorting and punching machine provided with sorting compartments selected by keys according to the classification of records and a special key for selecting a compartment for receiving checks of miscellaneous classifications, the combination with manually controlled means operable after a compartment has been selected for setting up an amount represented by a record to be punched on a card, of a card punching device controlled by the last-named means, and means controlled by said special key for causing the automatic operation of said punching device under control of said manually controlled means and the operation of the feeding means for feeding records of miscellaneous classification to the related compartment.

10. In a combined record sorting and punching machine, record sorting compartments, means including a plurality of keys for selecting said compartments according to the classifications of records and a special key for selecting a compartment adapted to receive records of miscellaneous classifications, means for setting up amounts represented by the records, a card punching machine controlled by the last-named means, means including said special key for causing the operation of said punching mechanism under control of said amount setting means, manually controlled means for causing the feeding of records into the compartments selected by the first-named keys and said special key, and means for locking the last-named means against a second operation until the punching operation has been completed.

11. In a record sorting and punching machine, record sorting compartments, means including keys for selecting said compartments according to the classification of records representing amounts and a special key for selecting a compartment for receiving records also representing amounts but of miscellaneous classifications, means for punching on a separate record the amount represented on the record sorted, and means including said special key for causing the automatic operation of said punching means.

12. In a record sorting and punching machine, record sorting compartments, means including keys for selecting said compartments according to the classification of records representing amounts and a special key for selecting a compartment for receiving records also representing amounts but of miscellaneous classifications, means for punching successively digit by digit on a separate record the amount represented on a record sorted, and means including said special key for causing the automatic operation of said punching means.

13. In a record sorting and punching machine provided with record sorting compartments, key controlled means for selecting said compartments according to the classification of records and including a special key for selecting a compartment receiving records of miscellaneous classifications, the combination with means for feeding records of the miscellaneous classification in the related compartment, means for causing records to be stacked therein in the sequence said records are fed thereto, punching means for punching on records amounts represented by the records, means including said special key for rendering the punching means operative concomitantly with the feeding of the records representing the amount punched, and means for ejecting the punched records from said punching means and for stacking them to correspond in order with the records fed in the compartment receiving records of miscellaneous classification.

14. In a machine of the class described, in combination a receptacle, record feeding means for feeding records into said receptacle, a card punching device for sequentially punching in different denominational columns of a card an amount represented by one of said records, and means for initiating the operation of said card punching device and for causing the operation of the feeding means for feeding a record to said receptacle as a card is punched by said card punching device to designate the amount represented by the same record.

15. In a record sorting and punching machine, a record receiving compartment, a card perforating apparatus for punching on separate cards amounts represented on the records received by said compartment, means for feeding records into said compartment, and means for causing the operation of said punching apparatus and concomitantly the operation of said feeding means whereby a separate card is punched to represent for each record an amount as the record representing the amount on the separate card is fed into said compartment by said feeding means.

16. In a punching machine, manually controlled means for setting up amounts represented by records, card punching means for punching a separate card to represent the amount on each record controlled by said setting means, a receptacle for receiving said records, means for feeding said records to said receptacle, and means for initiating the operation of said punching means and for causing the operation of means to effect the concomitant operation of said feeding means to feed a record to the receptacle while said punching means punches a separate card representing the amount on the record.

17. In a record sorting and punching machine, a record receiving compartment, a card perforating apparatus for punching digit by digit on separate cards amounts represented on the records received by said compartment, means for feeding records into said compartment, manually controlled means for initiating the operation of said card perforating apparatus to punch a card and simultaneously cause the operation of means to effect the operation of said record feeding means to feed the record representing the amount punched on the card in the compartment, and means controlled by said punching machine for locking said feeding means against a subsequent operation until said card perforating apparatus has completed its operation to punch the card.

18. In a punching machine, manually controlled means for setting up amounts represented by records, card punching means controlled by said setting means, a receptacle for receiving said records, means for feeding said records to said receptacle, means for causing the operation of said feeding means and for initiating the operation of said card punching means for punching a card concomitantly with the feeding of the related record to said receptacle, and means controlled by said punching means for locking said feeding means against a subsequent operation until said punching means has completed its operation while permitting the operation of said manually controlled setting means for setting up the amount of the next record.

19. In a system of the class described, the combination with a key controlled record sorting machine comprising check sorting compartments and means under control of keys for selecting said compartments and means for feeding checks to the selected compartments, of a punching machine comprising punching means and means for causing said punching means to punch cards to represent amounts represented by the records, and means for causing the operation of said punching means for punching a card designating an amount represented by the record deposited by said card feeding means in the compartment selected by said key.

20. In a system of the class described, the combination with keys manually operated to control the punching of amounts represented by records of one type on records of another type, of a sorting machine comprising sorting compartments and means under control of keys for selecting said compartments and means for feeding records of one of the aforementioned types to the selected compartments, a punching machine comprising punching means and means under control of the first named keys for causing the operation of said punching means, and means for causing the operation of said feeding means for feeding the records of one of the aforementioned types into the selected compartments.

21. In a combined sorting and punching machine provided with movable sorting compartments for sorting operations, means under control of keys for moving said compartments to bring a selected compartment to a common feeding position according to the classification of records, a punching mechanism including punching means, and means under control of supplemental keys for punching cards to represent amounts represented on the aforementioned records.

SAMUEL BRAND.